United States Patent
Hamaguchi et al.

(10) Patent No.: US 8,730,197 B2
(45) Date of Patent: May 20, 2014

(54) TOUCH PANEL CONTROLLER AND ELECTRONIC APPARATUS EMPLOYING SAME

(75) Inventors: Mutsumi Hamaguchi, Osaka (JP); Masayuki Miyamoto, Osaka (JP); Kunihiko Iizuka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/124,583

(22) PCT Filed: Jan. 23, 2012

(86) PCT No.: PCT/JP2012/051336
§ 371 (c)(1),
(2), (4) Date: Dec. 6, 2013

(87) PCT Pub. No.: WO2012/169215
PCT Pub. Date: Dec. 13, 2012

(65) Prior Publication Data
US 2014/0104236 A1    Apr. 17, 2014

(30) Foreign Application Priority Data
Jun. 10, 2011    (JP) .................................. 2011-130604

(51) Int. Cl.
G06F 3/044    (2006.01)
(52) U.S. Cl.
USPC .......................................... 345/173; 345/174
(58) Field of Classification Search
None
See application file for complete search history.

(56) References Cited

U.S. PATENT DOCUMENTS

| | | | |
|---|---|---|---|
| 2005/0141263 A1 | 6/2005 | Umeda et al. | |
| 2009/0009486 A1 | 1/2009 | Sato et al. | |
| 2011/0055305 A1 | 3/2011 | Matsushima | |
| 2011/0061948 A1* | 3/2011 | Krah et al. | 178/18.01 |
| 2011/0084918 A1 | 4/2011 | Sung | |
| 2013/0211757 A1 | 8/2013 | Miyamoto | |
| 2013/0271426 A1* | 10/2013 | Yumoto et al. | 345/174 |
| 2014/0035874 A1* | 2/2014 | Iizuka | 345/174 |

FOREIGN PATENT DOCUMENTS

| | | |
|---|---|---|
| JP | 2009-15489 A | 1/2009 |
| JP | 4387773 B2 | 12/2009 |
| JP | 2011-47774 A | 3/2011 |
| JP | 2011-81767 A | 4/2011 |
| JP | 2012-118957 A | 6/2012 |

* cited by examiner

Primary Examiner — Joseph Haley
(74) Attorney, Agent, or Firm — Birch, Stewart, Kolasch & Birch, LLP

(57) ABSTRACT

A touch panel controller (1), which can accurately detect changes in capacitance values of respective first and second electrostatic capacitors which are touched, includes: a driving section (4) for driving drive lines (DL1 through DL4) on the basis of a code sequence so as to drive (i) electrostatic capacitors (C31 through C34) provided between the respective drive lines (DL1 through DL4) and a sense line (SL3) and (ii) electrostatic capacitors (C41 through C44) provided between the respective drive lines (DL1 through DL4) and a sense line (SL4) so that (i) a first linear sum of first capacitance values of the respective electrostatic capacitors (C31 through C34) is outputted from the sense line (SL3) and (ii) a second linear sum of second capacitance values of the respective electrostatic capacitors (C41 through C44) is outputted from the sense line (SL4); a differential amplifier (5) for amplifying a difference between the first linear sum and the second linear sum; and a saturation prevention control section (8) for correcting a line dependency between the first capacitance values and the second capacitance values.

18 Claims, 24 Drawing Sheets

F I G. 2

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 7})$$

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXPRESSION 8})$$

$$\begin{pmatrix} 4 & 0 & 0 & 0 \\ 0 & 4 & 0 & 0 \\ 0 & 0 & 4 & 0 \\ 0 & 0 & 0 & 4 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXPRESSION 9})$$

DRIVING OF ALL DRIVE LINES ACCORDING TO ORTHOGONAL CODE SEQUENCE $$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 7})$$

INTEGRAL CALCULATION $$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXPRESSION 8})$$

$$\begin{pmatrix} 4 & 0 & 0 & 0 \\ 0 & 4 & 0 & 0 \\ 0 & 0 & 4 & 0 \\ 0 & 0 & 0 & 4 \end{pmatrix} \begin{pmatrix} C1 \\ C2 \\ C3 \\ C4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Y1 \\ Y2 \\ Y3 \\ Y4 \end{pmatrix} \quad \cdots (\text{EXPRESSION 9})$$

(b)

DRIVING OF DRIVE LINES ONE BY ONE $$\begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 10})$$

$$\begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 11})$$

F I G. 4

CASE WHERE C1=2.0pF, C2=1.9pF, C3=2.2pF, C4=2.1pF

CASE OF DRIVING DRIVE LINES ONE BY ONE WITH VDRIVE [V]

$$\left.\begin{array}{l}Y1=-2.0p/Cint*Vdrive\\Y2=-1.9p/Cint*Vdrive\\Y3=-2.2p/Cint*Vdrive\\Y4=-2.1p/Cint*Vdrive\end{array}\right\} \cdots (\text{EXPRESSION 12})$$

CASE OF DRIVING ALL DRIVE LINES ACCORDING TO ORTHOGONAL CODE SEQUENCE $$\left.\begin{array}{l}Y1=-8.2p/Cint*Vdrive\\Y2=-0.2p/Cint*Vdrive\\Y3=+0.4p/Cint*Vdrive\\Y4=-0.0p/Cint*Vdrive\end{array}\right\} \cdots (\text{EXPRESSION 13})$$

F I G. 5

$$Y1 = C1sig + C2sig + C3sig + C4sig + Noise1$$
$$Y2 = C1sig - C2sig + C3sig - C4sig + Noise2$$
$$Y3 = C1sig + C2sig - C3sig - C4sig + Noise3$$
$$Y4 = C1sig - C2sig - C3sig + C4sig + Noise4$$
$\cdots$ ( EXPRESSION 14 )

$$Y1 + Y2 + Y3 + Y4 = 4*C1sig + 2*Noise$$
$$Y1 - Y2 + Y3 - Y4 = 4*C2sig + 2*Noise$$
$$Y1 + Y2 - Y3 - Y4 = 4*C3sig + 2*Noise$$
$$Y1 - Y2 - Y3 + Y4 = 4*C4sig + 2*Noise$$
$\cdots$ ( EXPRESSION 15 )

$$C1 = C1sig + Noise/2$$
$$C2 = C2sig + Noise/2$$
$$C3 = C3sig + Noise/2$$
$$C4 = C4sig + Noise/2$$
$\cdots$ ( EXPRESSION 16 )

$$C1 = C1sig + Noise$$
$$C2 = C2sig + Noise$$
$$C3 = C3sig + Noise$$
$$C4 = C4sig + Noise$$
$\cdots$ ( EXPRESSION 17 )

F I G. 9

$$Y1 = C1sig/2 + C2sig/2 + C3sig/2 + C4sig/2 + Noise1$$
$$Y2 = C1sig\ -C2sig\ +C3sig\ -C4sig\ +Noise2$$
$$Y3 = C1sig\ +C2sig\ -C3sig\ -C4sig\ +Noise3$$
$$Y4 = C1sig\ -C2sig\ -C3sig\ +C4sig\ +Noise4$$
··· (EXPRESSION 22)

$$2Y1 + Y2 + Y3 + Y4 = 4*C1sig + sqrt(7)*Noise$$
$$2Y1 - Y2 + Y3 - Y4 = 4*C2sig + sqrt(7)*Noise$$
$$2Y1 + Y2 - Y3 - Y4 = 4*C3sig + sqrt(7)*Noise$$
$$2Y1 - Y2 - Y3 + Y4 = 4*C4sig + sqrt(7)*Noise$$
··· (EXPRESSION 23)

$$C1 = C1sig + sqrt(7/16)*Noise$$
$$C2 = C2sig + sqrt(7/16)*Noise$$
$$C3 = C3sig + sqrt(7/16)*Noise$$
$$C4 = C4sig + sqrt(7/16)*Noise$$
··· (EXPRESSION 24)

$$C1 = C1sig + Noise$$
$$C2 = C2sig + Noise$$
$$C3 = C3sig + Noise$$
$$C4 = C4sig + Noise$$
··· (EXPRESSION 25)

$$Y1 = C1sig + C2sig \qquad\qquad + Noise1$$
$$Y1' = \qquad\qquad + C3sig + C4sig + Noise1'$$
$$Y2 = C1sig - C2sig + C3sig - C4sig + Noise2 \quad \cdots (\text{EXPRESSION 31})$$
$$Y3 = C1sig + C2sig - C3sig - C4sig + Noise3$$
$$Y4 = C1sig - C2sig - C3sig + C4sig + Noise4$$

$$(Y1+Y1') + Y2 + Y3 + Y4 = 4*C1sig + sqrt(5)*Noise$$
$$(Y1+Y1') - Y2 + Y3 - Y4 = 4*C2sig + sqrt(5)*Noise$$
$$(Y1+Y1') + Y2 - Y3 - Y4 = 4*C3sig + sqrt(5)*Noise \quad \cdots (\text{EXPRESSION 32})$$
$$(Y1+Y1') - Y2 - Y3 + Y4 = 4*C4sig + sqrt(5)*Noise$$

$$C1 = C1sig + sqrt(5/16)*Noise$$
$$C2 = C2sig + sqrt(5/16)*Noise$$
$$C3 = C3sig + sqrt(5/16)*Noise \quad \cdots (\text{EXPRESSION 33})$$
$$C4 = C4sig + sqrt(5/16)*Noise$$

$$C1 = C1sig + Noise$$
$$C2 = C2sig + Noise$$
$$C3 = C3sig + Noise \quad \cdots (\text{EXPRESSION 34})$$
$$C4 = C4sig + Noise$$

FIG. 17

$$\begin{pmatrix} 1 & 1 & 0 & 0 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 37})$$

$$\begin{pmatrix} 2 & 1 & 0 & 1 \\ 2 & -1 & 0 & -1 \\ 2 & 1 & -2 & -1 \\ 2 & -1 & -2 & 1 \end{pmatrix} \begin{pmatrix} 1 & 1 & 0 & 0 \\ 1 & -1 & 1 & -1 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} 2 & 1 & 0 & 1 \\ 2 & -1 & 0 & -1 \\ 2 & 1 & -2 & -1 \\ 2 & -1 & -2 & 1 \end{pmatrix} \begin{pmatrix} Y1 \\ Y2 \\ Y3 \\ Y4 \end{pmatrix} \quad \cdots (\text{EXPRESSION 38})$$

$$\begin{pmatrix} 4 & 0 & 0 & 0 \\ 0 & 4 & 0 & 0 \\ 0 & 0 & 4 & 0 \\ 0 & 0 & 0 & 4 \end{pmatrix} \begin{pmatrix} C1 \\ C2 \\ C3 \\ C4 \end{pmatrix} = \begin{pmatrix} 2 & 1 & 0 & 1 \\ 2 & -1 & 0 & -1 \\ 2 & 1 & -2 & -1 \\ 2 & -1 & -2 & 1 \end{pmatrix} \begin{pmatrix} Y1 \\ Y2 \\ Y3 \\ Y4 \end{pmatrix} \quad \cdots (\text{EXPRESSION 39})$$

$$\left.\begin{array}{l} Y1 = C1sig + C2sig \quad\quad\quad + Noise1 \\ Y2 = C1sig - C2sig + C3sig - C4sig + Noise2 \\ Y3 = C1sig + C2sig - C3sig - C4sig + Noise3 \\ Y4 = C1sig - C2sig - C3sig + C4sig + Noise4 \end{array}\right\} \cdots (\text{EXPRESSION 40})$$

$$\left.\begin{array}{l} 2Y1 + Y2 \quad\quad + Y4 = 4*C1sig + sqrt(6)*Noise \\ 2Y1 - Y2 \quad\quad - Y4 = 4*C2sig + sqrt(6)*Noise \\ 2Y1 + Y2 - 2Y3 - Y4 = 4*C3sig + sqrt(10)*Noise \\ 2Y1 - Y2 - 2Y3 + Y4 = 4*C4sig + sqrt(10)*Noise \end{array}\right\} \cdots (\text{EXPRESSION 41})$$

$$\left.\begin{array}{l} C1 = C1sig + sqrt(6/16)*Noise \\ C2 = C2sig + sqrt(6/16)*Noise \\ C3 = C3sig + sqrt(10/16)*Noise \\ C4 = C4sig + sqrt(10/16)*Noise \end{array}\right\} \cdots (\text{EXPRESSION 42})$$

$$\left.\begin{array}{l} C1 = C1sig + Noise \\ C2 = C2sig + Noise \\ C3 = C3sig + Noise \\ C4 = C4sig + Noise \end{array}\right\} \cdots (\text{EXPRESSION 43})$$

F I G. 1 9

$$\begin{pmatrix} 1 & 1 & 1 & 1 \\ 1 & -1 & 0 & 0 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 46})$$

$$\begin{pmatrix} 1 & 2 & 1 & 0 \\ 1 & -2 & 1 & 0 \\ 1 & 2 & -1 & -2 \\ 1 & -2 & -1 & 2 \end{pmatrix} \begin{pmatrix} 1 & 1 & 1 & 1 \\ 1 & -1 & 0 & 0 \\ 1 & 1 & -1 & -1 \\ 1 & -1 & -1 & 1 \end{pmatrix} \begin{pmatrix} C1 \\ C2 \\ C3 \\ C4 \end{pmatrix} = \begin{pmatrix} 1 & 2 & 1 & 0 \\ 1 & -2 & 1 & 0 \\ 1 & 2 & -1 & -2 \\ 1 & -2 & -1 & 2 \end{pmatrix} \begin{pmatrix} Y1 \\ Y2 \\ Y3 \\ Y4 \end{pmatrix} \quad \cdots (\text{EXPRESSION 47})$$

$$\begin{pmatrix} 4 & 0 & 0 & 0 \\ 0 & 4 & 0 & 0 \\ 0 & 0 & 4 & 0 \\ 0 & 0 & 0 & 4 \end{pmatrix} \begin{pmatrix} C1 \\ C2 \\ C3 \\ C4 \end{pmatrix} = \begin{pmatrix} 1 & 2 & 1 & 0 \\ 1 & -2 & 1 & 0 \\ 1 & 2 & -1 & -2 \\ 1 & -2 & -1 & 2 \end{pmatrix} \begin{pmatrix} Y1 \\ Y2 \\ Y3 \\ Y4 \end{pmatrix} \quad \cdots (\text{EXPRESSION 48})$$

```
Y1=C1sig+C2sig+C3sig+C4sig+Noise1 ⎫
Y2=C1sig-C2sig            +Noise2  ⎬ ···(EXPRESSION 49)
Y3=C1sig+C2sig-C3sig-C4sig+Noise3  ⎪
Y4=C1sig-C2sig-C3sig+C4sig+Noise4  ⎭
```

```
Y1+2Y2+Y3    =4*C1sig+sqrt(6) *Noise ⎫
Y1-2Y2+Y3    =4*C2sig+sqrt(6) *Noise ⎬ ···(EXPRESSION 50)
Y1+2Y2-Y3-2Y4=4*C3sig+sqrt(10)*Noise ⎪
Y1-2Y2-Y3+2Y4=4*C4sig+sqrt(10)*Noise ⎭
```

```
C1=C1sig+sqrt(6/16) *Noise  ⎫
C2=C2sig+sqrt(6/16) *Noise  ⎬ ···(EXPRESSION 51)
C3=C3sig+sqrt(10/16)*Noise  ⎪
C4=C4sig+sqrt(10/16)*Noise  ⎭
```

```
C1=C1sig+Noise ⎫
C2=C2sig+Noise ⎬ ···(EXPRESSION 52)
C3=C3sig+Noise ⎪
C4=C4sig+Noise ⎭
```

$$\begin{bmatrix} 1 & 1 & 1 \\ 1 & -1 & 1 \\ 1 & 1 & -1 \end{bmatrix} \begin{bmatrix} C1 \\ C2 \\ C3 \end{bmatrix} = \begin{bmatrix} Y1 \\ Y2 \\ Y3 \end{bmatrix} \quad \cdots \text{(EXPRESSION 53)}$$

$$\begin{bmatrix} 0 & 1 & 1 \\ 1 & -1 & 0 \\ 1 & 0 & -1 \end{bmatrix} \begin{bmatrix} 1 & 1 & 1 \\ 1 & -1 & 1 \\ 1 & 1 & -1 \end{bmatrix} \begin{bmatrix} C1 \\ C2 \\ C3 \end{bmatrix} = \begin{bmatrix} 0 & 1 & 1 \\ 1 & -1 & 0 \\ 1 & 0 & -1 \end{bmatrix} \begin{bmatrix} Y1 \\ Y2 \\ Y3 \end{bmatrix} \quad \cdots \text{(EXPRESSION 54)}$$

$$\begin{bmatrix} 2 & 0 & 0 \\ 0 & 2 & 0 \\ 0 & 0 & 2 \end{bmatrix} \begin{bmatrix} C1 \\ C2 \\ C3 \end{bmatrix} = \begin{bmatrix} 0 & 1 & 1 \\ 1 & -1 & 0 \\ 1 & 0 & -1 \end{bmatrix} \begin{bmatrix} Y1 \\ Y2 \\ Y3 \end{bmatrix} \quad \cdots \text{(EXPRESSION 55)}$$

(b)

EMPLOY VECTORS BELOW IN CASE OF SIGNAL SATURATION $$\begin{bmatrix} -1 & 1 & -1 \\ 1 & -1 & -1 \\ -1 & -1 & 1 \end{bmatrix} \begin{bmatrix} C1 \\ C2 \\ C3 \end{bmatrix} = \begin{bmatrix} Y1' \\ Y2' \\ Y3' \end{bmatrix} \quad \cdots \text{(EXPRESSION 56)}$$

$$\begin{bmatrix} -1 & 0 & -1 \\ 0 & -1 & -1 \\ -1 & -1 & 0 \end{bmatrix} \begin{bmatrix} -1 & 1 & -1 \\ 1 & -1 & -1 \\ -1 & -1 & 1 \end{bmatrix} \begin{bmatrix} C1 \\ C2 \\ C3 \end{bmatrix} = \begin{bmatrix} -1 & 0 & -1 \\ 0 & -1 & -1 \\ -1 & -1 & 0 \end{bmatrix} \begin{bmatrix} Y1' \\ Y2' \\ Y3' \end{bmatrix} \quad \cdots \text{(EXPRESSION 57)}$$

$$\begin{bmatrix} 2 & 0 & 0 \\ 0 & 2 & 0 \\ 0 & 0 & 2 \end{bmatrix} \begin{bmatrix} C1 \\ C2 \\ C3 \end{bmatrix} = \begin{bmatrix} -1 & 0 & -1 \\ 0 & -1 & -1 \\ -1 & -1 & 0 \end{bmatrix} \begin{bmatrix} Y1' \\ Y2' \\ Y3' \end{bmatrix} \quad \cdots \text{(EXPRESSION 58)}$$

FIG. 24

1st vector $\quad \dfrac{-(C_{31})Vdrive}{C_{int}} \quad \cdots$ ( EXPRESSION 1 )

2nd vector $\quad \dfrac{-(C_{32})Vdrive}{C_{int}} \quad \cdots$ ( EXPRESSION 2 )

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots \text{( EXPRESSION 3 )}$$

$$\begin{bmatrix} C1 \\ C2 \\ C3 \\ C4 \end{bmatrix} = \begin{bmatrix} Y1 \\ Y2 \\ Y3 \\ Y4 \end{bmatrix} \quad \cdots \text{( EXPRESSION 4 )}$$

TOUCH PANEL CONTROLLER AND ELECTRONIC APPARATUS EMPLOYING SAME

TECHNICAL FIELD

The present invention relates to (i) a touch panel controller which drives in parallel a plurality of drive lines and which estimates or detects capacitance values of respective electrostatic capacitors which are formed in a matrix manner and (ii) an electronic apparatus which employs the touch panel controller.

BACKGROUND ART

Patent Literature 1 discloses a device for detecting capacitance values of respective electrostatic capacitors which are distributed in a matrix manner, that is, a capacitance detecting device for detecting distribution of capacitance values of respective electrostatic capacitors which are defined by M drive lines and L sense lines so as to be arranged in a matrix manner. When a touch panel is touched with a finger or a pen, the capacitance detecting device detects the touch of the finger or pen by detecting a change in capacitance value of an electrostatic capacitor that corresponds to a part of a touch panel, which part is touched by the finger or the pen.

FIG. 23 is a view schematically illustrating a configuration of a conventional touch panel system 91. FIG. 24 is an explanatory view for describing a method of driving the touch panel system 91. The touch panel system 91 includes a touch panel 92. The touch panel 92 includes drive lines DL1 through DL4, sense lines SL1 through SL4, and electrostatic capacitors C11 through C44 which are provided at respective intersections where the drive lines DL1 through DL4 and the sense lines SL1 through SL4 intersect with each other.

The touch panel system 91 includes a driving section 94. The driving section 94 drives the drive lines DL1 through DL4 on the basis of a code sequence of four rows and four columns which is represented by Expression 3 in FIG. 24. The driving section 94 applies a voltage Vdrive in a case where an element of the code sequence equals to "1", whereas the drive section applies no voltage in a case where the element equals to "0".

The touch panel system 91 includes four amplifiers 98 which are provided for the respective sense lines SL1 through SL4. Each of the amplifiers 98 receives and amplifies linear sums Y1, Y2, Y3, and Y4 of electrostatic capacitors, which are provided along a sense line to which the amplifier 98 is connected among the sense lines SL1 through SL4, and are driven by the driving section 94.

For example, in the first driving of four drivings based on the code sequence of four rows and four columns, the driving section 94 applies a voltage Vdrive to the drive line DL1, while applying no voltage to the drive lines DL2 through DL4. For example, from the amplifier 98 connected to the sense line SL3, a measurement value Y1 (see Expression 1 in FIG. 24) of the electrostatic capacitor C31 is outputted as a result of the application of the voltage Vdrive.

In the second driving of the four drivings, the driving section 94 applies a voltage Vdrive to the drive line DL2, while applying no voltage to the drive lines DL1, DL3, and DL4. In this case, a measurement value Y2 (see Expression 2 in FIG. 24) of the electrostatic capacitor C32 is consequently outputted from the amplifier 98 connected to the sense line SL3.

In the third driving of the four drivings, the driving section 94 applies a voltage Vdrive to the drive line DL3, while applying no voltage to the drive lines DL1, DL2, and DL4. In the fourth driving of the four drivings, the driving section 94 applies a voltage Vdrive to the drive line DL4, while applying no voltage to the drive lines DL1, DL2, and DL3.

The measurement values Y1, Y2, Y3, and Y4 are correlated with respective electrostatic capacitance values C1, C2, C3, and C4 (see Expressions 3 and 4 in FIG. 24). Note that, for simple description, a coefficient (−Vdrive/Cint) for each of the measurement values Y1 through Y4 is omitted from Expressions 3 and 4 in FIG. 24.

CITATION LIST

Patent Literature

Patent Literature 1
Japanese Patent Publication No. 4387773 B, specification (Publication Date: Jun. 16, 2005)

SUMMARY OF INVENTION

Technical Problem

According to the configuration illustrated in FIGS. 23 and 24, however, only capacitance data of an electrostatic capacitor at the intersection with one (1) drive line can be obtained through one (1) measurement. Therefore, a noise component is large. In order to accurately detect a change in capacitance value of an electrostatic capacitor, it is necessary to repeat the same sensing operation more than once, and then average results of the repeated sensing operation. This causes a problem that it is difficult to increase a processing speed.

An object of the present invention is to provide (i) a touch panel controller capable of accurately detecting a change in capacitance value of an electrostatic capacitor by carrying out a sensing operation fewer times and (ii) an electronic apparatus which employs the touch panel controller.

Solution to Problem

In order to attain the object, a touch panel controller of the present invention is configured to include: a driving section for driving M drive lines on the basis of a code sequence having a length of N (N≥M) so as to drive (i) a plurality of first electrostatic capacitors provided between the respective M drive lines and a first sense line and (ii) a plurality of second electrostatic capacitors provided between the respective M drive lines and a second sense line that is adjacent to the first sense line so that (i) a first linear sum of first capacitance values of the respective plurality of first electrostatic capacitors is outputted from the first sense line and (ii) a second linear sum of second capacitance values of the respective plurality of second electrostatic capacitors is outputted from the second sense line; a differential amplifier for amplifying a difference between the first linear sum and the second linear sum; and correction means for correcting a line dependency between the first capacitance values and the second capacitance values.

"Line dependency" in this specification means that, though a touch panel is produced so that (i) capacitance values of electrostatic capacitors formed between a drive line and a sense line are equal to one another and (ii) capacitance values of parasitic components including wires are equal to one another, the capacitance values actually tend to differ from one another depending on the sense line or the drive line due to a process of producing the touch panel.

According to the configuration, the driving section drives the M drive lines on the basis of the code sequence having the length of N (N≥M) so as to drive (i) the plurality of first electrostatic capacitors provided between the respective M drive lines and the first sense line and (ii) the plurality of second electrostatic capacitors provided between the respective M drive lines and the second sense line that is adjacent to the first sense line so that (i) the first linear sum of the first capacitance values of the respective plurality of first electrostatic capacitors is outputted from the first sense line and (ii) the second linear sum of the second capacitance values of the respective plurality of second electrostatic capacitors is outputted from the second sense line. In a case where the differential amplifier amplifies the difference between the first linear sum and the second linear sum, the correction means corrects the line dependency between the first capacitance values and the second capacitance values. It is therefore possible to accurately detect changes in capacitance values of first and second electrostatic capacitors which are touched, even if the first and second electrostatic capacitors are produced with capacitance value variations depending on lines due to a production process.

In order to attain the object, an electronic apparatus of the present invention is configured to include: the touch panel controller of the present invention; a touch panel controlled by the touch panel controller; and a display panel which (i) is provided so as to overlap the touch panel or (ii) has the touch panel built-in.

According to the configuration, the driving section drives the M drive lines on the basis of the code sequence having the length of N (N≥M) so as to drive (i) the plurality of first electrostatic capacitors provided between the respective M drive lines and the first sense line and (ii) the plurality of second electrostatic capacitors provided between the respective M drive lines and the second sense line that is adjacent to the first sense line so that (i) the first linear sum of the first capacitance values of the respective plurality of first electrostatic capacitors is outputted from the first sense line and (ii) the second linear sum of the second capacitance values of the respective plurality of second electrostatic capacitors is outputted from the second sense line. In a case where the differential amplifier amplifies the difference between the first linear sum and the second linear sum, the correction means corrects the line dependency between the first capacitance values and the second capacitance values. It is therefore possible to obtain an electronic apparatus which includes a touch panel controller which can accurately detect changes in capacitance values of first and second electrostatic capacitors which are touched, even if the first and second electrostatic capacitors are produced with capacitance value variations depending on lines due to a production process.

Advantageous Effects of Invention

The touch panel controller of the present invention thus includes the correction means for correcting the line dependency between the first capacitance values of the respective plurality of first electrostatic capacitors and the second capacitance values of the respective plurality of second electrostatic capacitors. It is therefore possible to accurately detect, by carrying out a sensing operation fewer times, changes in capacitance values of first and second electrostatic capacitors which are touched, even if the first and second electrostatic capacitors are produced with capacitance value variations depending on lines due to a production process.

For a fuller understanding of the nature and advantages of the invention, reference should be made to the ensuing detailed description taken in conjunction with the accompanying drawings.

BRIEF DESCRIPTION OF DRAWINGS

FIG. 2 represents numerical expressions for estimating capacitance values of electrostatic capacitors in the touch panel system which is driven according to an orthogonal code sequence.

FIG. 3 is an explanatory view for describing the reason why it is advantageous to drive all drive lines according to the orthogonal code sequence. (a) of FIG. 3 represents numerical expressions for estimating capacitance values of electrostatic capacitors which are driven according to the orthogonal code sequence. (b) of FIG. 3 represents numerical expressions for calculating capacitance values of electrostatic capacitors which are driven according to a method of driving the drive lines one by one.

FIG. 4 is an explanatory view for describing the reason why it is advantageous to drive all drive lines according to the orthogonal code sequence.

FIG. 5 is an explanatory view for describing the reason why it is advantageous to drive all drive lines according to the orthogonal code sequence.

FIG. 9 is an explanatory view for describing an SN ratio of the touch panel system of Embodiment 1.

FIG. 10 is a view illustrating an M-sequence code according to which the touch panel system of Embodiment 1 is driven.

FIG. 11 is a view illustrating a decode matrix according to which capacitance values of electrostatic capacitors which have been driven according to the M-sequence code are decoded.

FIG. 15 is an explanatory view for describing an SN ratio of the touch panel system of Embodiment 3.

FIG. 17 is an explanatory view for describing an SN ratio of the touch panel system of Embodiment 4.

FIG. 19 is an explanatory view for describing an SN ratio of the another touch panel system of Embodiment 4.

FIG. 20 is an explanatory view for describing a code sequence according to which a touch panel system of Embodiment 5 is driven. (a) of FIG. 20 illustrates a conventional driving method. (b) of FIG. 20 illustrates a driving method of Embodiment 5.

FIG. 24 is an explanatory view for describing a method of driving the conventional touch panel system.

DESCRIPTION OF EMBODIMENTS

The inventors of the present invention have already proposed, in the earlier Japanese Patent Application (Tokugan, No. 2011-022022, Filing Date: Feb. 9, 2011, Priority Date: Nov. 12, 2010), a touch panel system which drives in parallel a plurality of drive lines and which estimates capacitance values. The present Embodiments are based on the touch panel system. Therefore, first, the touch panel system proposed in the earlier application will be described below as a premise of the present Embodiments. Then, various touch panel systems of the present Embodiments will be described.

(Premise of the Present Embodiments)

(Driving According to Orthogonal Code Sequence)

Figure 1:
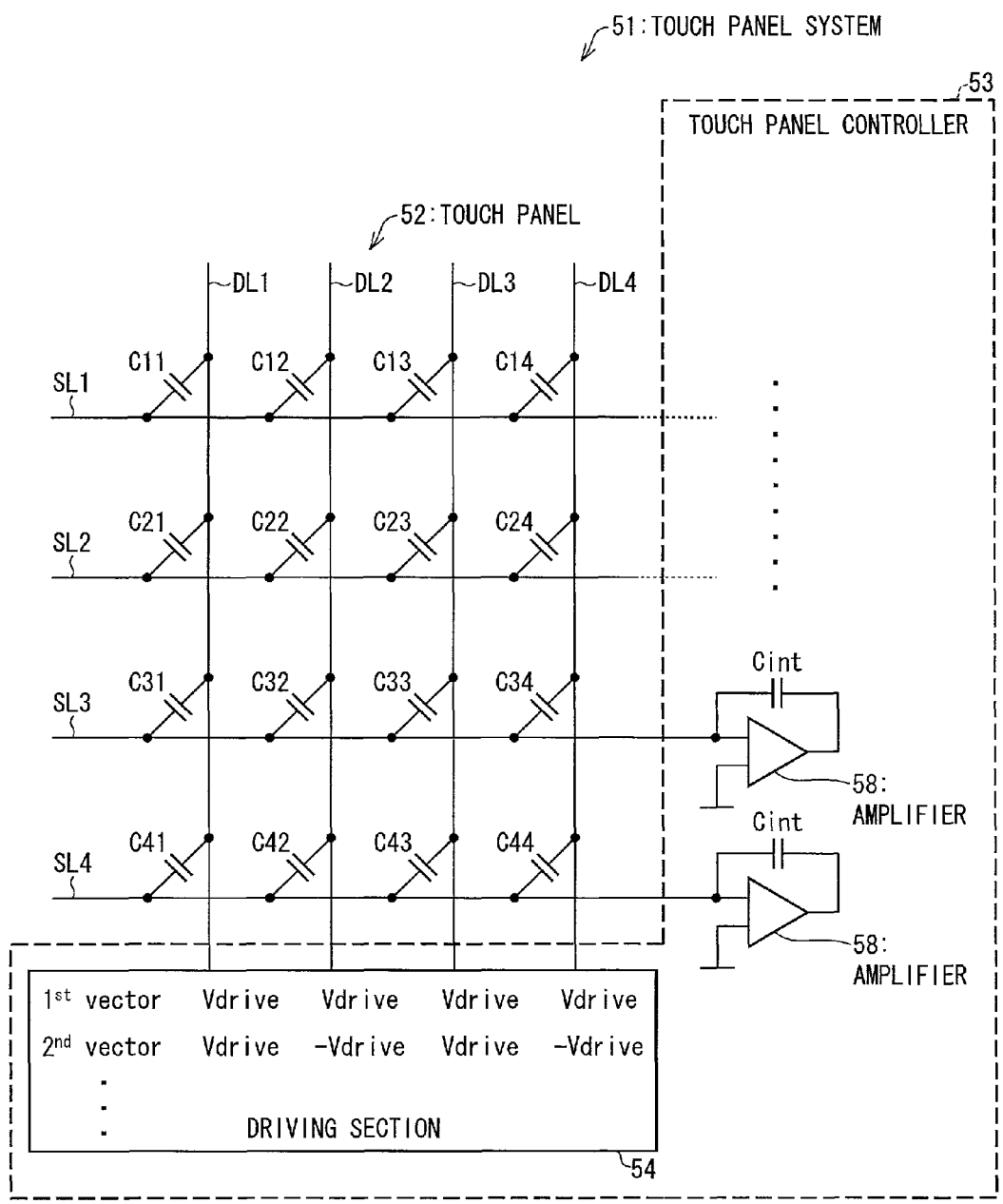
FIG. 1 is a view schematically illustrating a configuration of a touch panel system on which the present Embodiments are premised.

FIG. 1 is a view schematically illustrating a configuration of a touch panel system 51 on which the present Embodiments are premised. FIG. 2 represents numerical expressions for estimating capacitance values of electrostatic capacitors in the touch panel system 51 which is driven according to an orthogonal code sequence. The touch panel system 51 includes a touch panel 52 and a touch panel controller 53. The touch panel 52 includes drive lines DL1 through DL4, sense lines SL1 through SL4, and electrostatic capacitors C11 through C44 which are provided at respective intersections where the drive lines DL1 through DL4 and the sense lines SL1 through SL4 intersect with each other.

The touch panel controller 53 includes a driving section 54. The driving section 54 drives the drive lines DL1 through DL4 on the basis of an orthogonal code sequence of four rows and four columns which is represented by Expression 7 in FIG. 2. Each element of the orthogonal code sequence equals to "1" or "−1". In a case where the element equals to "1", the driving section 54 applies a voltage Vdrive, whereas in a case where the element equals to "−1", the driving section 54 applies a voltage −Vdrive. Note here that the voltage Vdrive can be a power supply voltage or a voltage other than the power supply voltage.

The "orthogonal code sequence" in this specification means a code sequence $di=(di1, di2, \ldots, diN)$ $(i=1, \ldots, M)$ which (i) has a code length of N and (ii) meets the following condition.

$$di \cdot dk = \sum_{j=1}^{N} dij \times dkj \quad \text{[Math. 1]}$$
$$= N \times \delta ik$$

where $\delta ik=1$ if $i=k$
$\delta ik=0$ if $i \neq k$

Examples of the "orthogonal code sequence" include an Hadamard matrix which is created by Sylvester method.

The Hadamard matrix, which is created by Sylvester method, first creates a building block of 2 rows×2 columns as a basic structure. The building block includes four bits, among which an upper right one, an upper left one, and a lower left one are identical to one another, whereas a lower right one is an inverse of the upper right, upper left, and lower left bits.

The Hadamard matrix then combines four blocks of the building block of 2 rows×2 columns at upper right, upper left, lower right, and lower left locations so as to create codes in a bit arrangement of 4 rows×4 columns. The Hadamard matrix also inverts bits in the lower right block as in the above creation of the building block of 2 rows×2 columns. Next, the Hadamard matrix similarly creates codes in a bit arrangement of 8 rows×8 columns, and then creates codes in a bit arrangement of 16 rows×16 columns. These matrices each satisfy the above-mentioned definition of the "orthogonal code sequence" of the present invention. An orthogonal code sequence of 4 rows×4 columns, illustrated in FIG. 2, is an Hadamard matrix of 4 rows×4 columns created by Sylvester method.

An Hadamard matrix is a square matrix which includes elements each being 1 or −1 and which includes rows orthogonal to one another. In other words, any two rows in the Hadamard matrix represent vectors perpendicular to each other.

The "orthogonal code sequence" of the present invention can be any N-row matrix taken from an M-dimensional Hadamard matrix (where N≤M). As described below, an Hadamard matrix created by a method other than Sylvester method can alternatively be used in the present invention.

While any N-dimensional Hadamard matrix created by Sylvester method can be expressed by a power of M=2, it is assumed that an Hadamard matrix can be created if M is a multiple of 4. The Hadamard matrix is created, for example, in a case where M=12 or in a case where M=20. These Hadamard matrices created by a method other than Sylvester method can alternatively be used as the orthogonal code sequence of the present Embodiments.

The touch panel system 51 includes four amplifiers 58 which are provided for the respective sense lines SL1 through SL4. Each of the amplifiers 58 (i) receives and amplifies linear sums Y1, Y2, Y3, and Y4 along a corresponding one of the sense lines SL1 through SL4, to which sense line corresponding ones of the electrostatic capacitors C11 through C44 belong, which corresponding electrostatic capacitors are driven by the driving section 54.

For example, in the first driving of four drivings based on the orthogonal code sequence of 4 rows×4 columns, the driving section 54 applies a voltage Vdrive to all the drive lines DL1 through DL4. For example, a measurement value Y1 (see Expression 5 below) is consequently outputted from the amplifier 58 connected to the sense line SL3. In the second driving of the four drivings, the driving section 54 applies a voltage Vdrive to the drive lines DL1 and DL3, while applying a voltage −Vdrive to the drive lines DL2 and DL4. In this case, a measurement value Y2 (see Expression 6 below) is consequently outputted from the amplifier 58 connected to the sense line SL3.

[Math. 2]

$1^{st}$ vector (Expression 5)

$$\frac{-(C_{31} + C_{32} + C_{33} + C_{34})Vdrive}{C_{int}}$$

$2^{nd}$ vector (Expression 6)

$$\frac{-(C_{31} - C_{32} + C_{33} - C_{34})Vdrive}{C_{int}}$$

In the third driving of the four drivings, the driving section 54 applies a voltage Vdrive to the drive lines DL1 and DL2, while applying a voltage −Vdrive to the drive lines DL3 and DL4. In this case, a measurement value Y3 is consequently outputted from the amplifier 58 connected to the sense line SL3. In the fourth driving of the four drivings, the driving section 54 applies a voltage Vdrive to the drive lines DL1 and DL4, while applying a voltage −Vdrive to the drive lines DL2 and DL3. In this case, a measurement value Y4 is consequently outputted from the amplifier 58 connected to the sense line SL3.

Note here that, for easy explanation, the electrostatic capacitors C31 through C34 illustrated in FIG. 1 are represented by respective C1 through C4 in Expressions 7 through 9 in FIG. 2. Note also that, for simple description, a coefficient (−Vdrive/Cint) for each of the measurement values Y1 through Y4 is omitted from (i) Expressions 7 through 9 in each of FIG. 2 and (a) of FIG. 3 and (ii) Expressions 10 and 11 in (b) of FIG. 3. The same applies to (i) Expressions 37 through 39 in FIG. 14, (ii) Expressions 46 through 48 in FIG. 16 and (iii) Expressions 53 through 58 in FIG. 17 (these Expressions will be later described).

Inner products of the measurement values Y1 through Y4 and the orthogonal code sequence are calculated out (see Expression 8 in FIG. 2). On the basis of the inner product, capacitance values of the respective electrostatic capacitors C1 through C4 can be estimated (see Expression 9 in FIG. 2).

(Reason why Driving according to Orthogonal Code Sequence is Advantageous)

FIG. 3 is an explanatory view for describing the reason why it is advantageous to drive all the drive lines according to the orthogonal code sequence. (a) of FIG. 3 represents numerical expressions for estimating capacitance values of electrostatic capacitors which are driven according to the orthogonal code sequence. (b) of FIG. 3 represents numerical expressions for calculating capacitance values of electrostatic capacitors which are driven according to a method of driving the drive lines one by one. Each of FIGS. 4 and 5 is an explanatory view for describing the reason why it is advantageous to drive all the drive lines according to the orthogonal code sequence.

For easy explanation, assume that an operation is carried out not according to a method of detecting a capacitance difference by use of a differential amplifier but in a signal mode in which an amplifier is provided for each sense line. As illustrated in FIG. 4, for example, in a case where (i) the capacitance values of the respective electrostatic capacitors C1 through C4 equal to 2.0 pF, 1.9 pF, 2.2 pF, and 2.1 pF, respectively, and (ii) the drive lines are driven with a voltage Vdrive [V] according to the conventional method of driving drive lines one by one (see FIGS. 20 and 21), the measurement values Y1 through Y4 of respective linear sums take the values shown by Expression in FIG. 4 in the range of 1.9 p/Cint×Vdrive to 2.2 p/Cint×Vdrive.

On the other hand, in a case where (i) the capacitance values of the respective electrostatic capacitors C1 through C4 equal to 2.0 pF, 1.9 pF, 2.2 pF, and 2.1 pF, respectively, and (ii) the drive lines are driven according to the method of driving all the drive lines according to the orthogonal code sequence (see FIGS. 1 and 2), the measurement value Y1 of a linear sum is −8.2 p/Cint×Vdrive (see Expression 13 in FIG. 4), and the measurement values Y2 through Y4 of respective linear sums take the values shown by Expression 13 in FIG. 4 in the range of +0.4 p/Cint×Vdrive to −0.2 p/Cint×Vdrive.

As to the measurement values Y2 through Y4, signal components thereof, which are obtained in a first case of the method of driving all the drive lines according to the orthogonal code sequence, are smaller than those obtained in a second case of the method of driving the drive lines one by one. In the first case, the measurement value Y1, which is obtained in a case where all elements of the orthogonal code sequence are "1", is large. This requires a larger dynamic range. The measurement value Y1 is, however, unlikely to be increased by causing a differential amplifier to extract a capacitance difference.

Assume that noises Noise1 through Noise4 (see Expression 14 in FIG. 5) are uncorrelated with one another. On the assumption, the method of driving all the drive lines according to the orthogonal code sequence is more advantageous in terms of noise than the method of driving the drive lines one by one (see Expressions 16 and 17 in FIG. 5). The reason why the method of driving all the drive lines according to the orthogonal code sequence is more advantageous in terms of SN ratio (noise) is considered as follows. That is, data of the electrostatic capacitors which intersect the plurality of drive lines are obtained through one (1) measurement, and data corresponding to a code length is obtained. Therefore, in view of an SN ratio obtained after calculation of an inner product, noise components are reduced. In a case where the code length is L, the SN ratio becomes more advantageous by $L^{1/2}$. Such an advantage remarkably outstands in a case where the method of driving all the drive lines according to the orthogonal code sequence is applied to a large-size panel.

In a case where it is configured that a differential amplifier extracts a capacitance difference, the differential amplifier extracts only a difference in capacitance value (component) between electrostatic capacitors. Therefore, for example, in a case where it is assumed that (i) an electrostatic capacitance component is 2 pF and (ii) the electrostatic capacitance component changes by 10%, the differential amplifier extracts only 0.2 pF, but does not output an absolute capacitance component. This allows an integral capacitance to be relatively reduced (This allows a gain to be increased). It is therefore possible to moderate a requirement for specifications of an AD converter.

Figure 6:
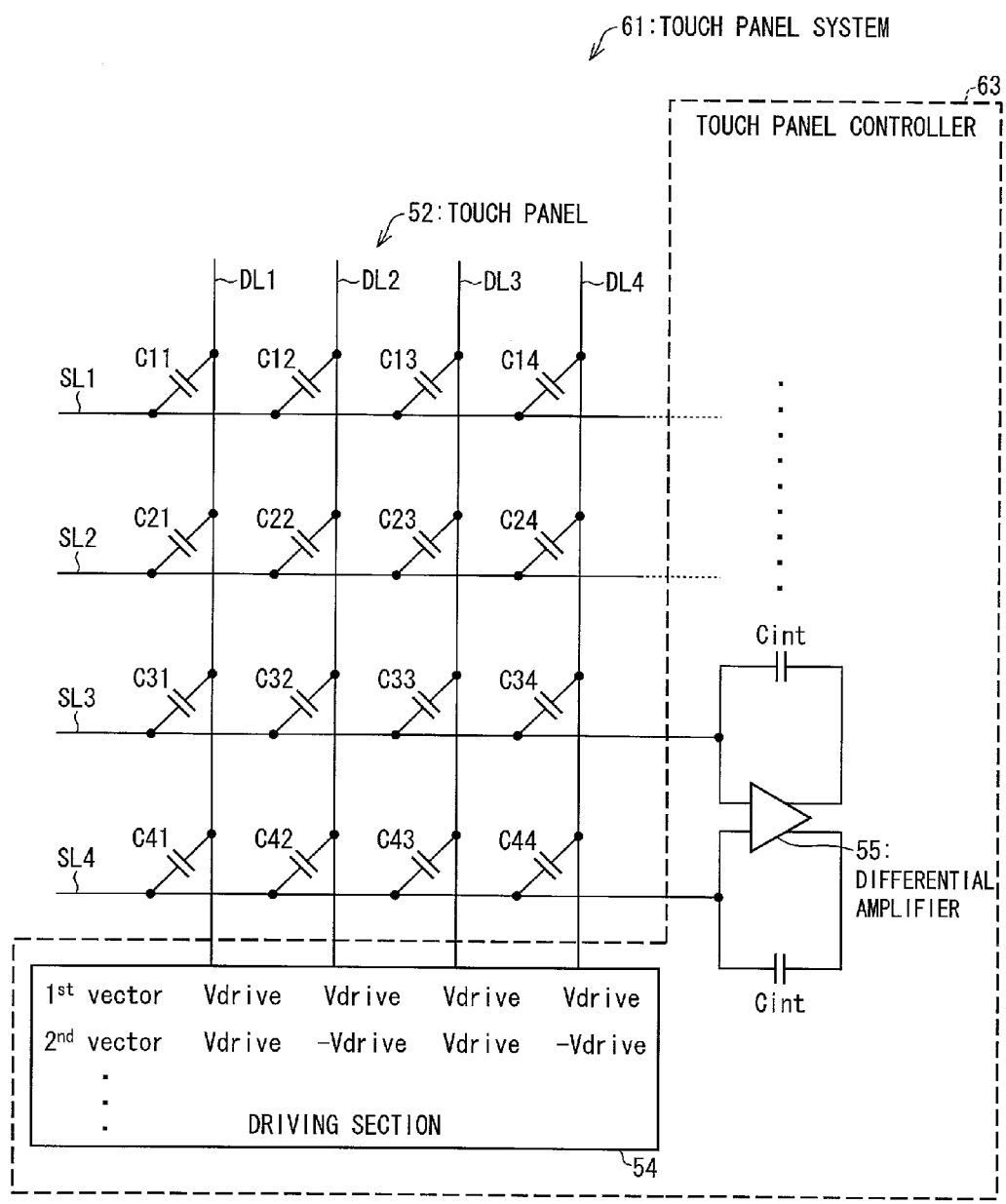
FIG. 6 is a view schematically illustrating a configuration of another touch panel system on which the present Embodiments are premised.
Figure 7:
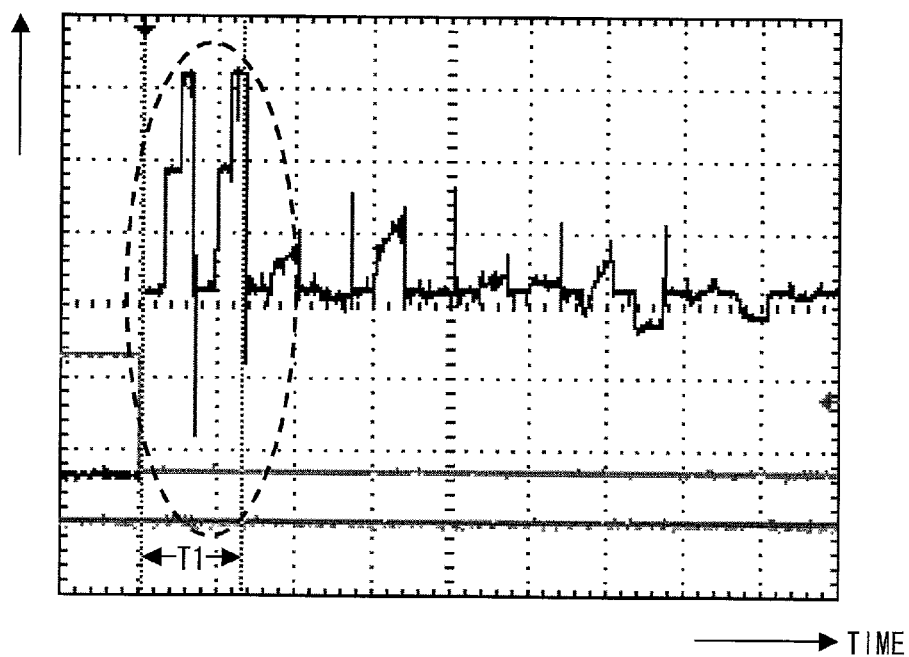
FIG. 7 is a graph for explaining a problem of the touch panel system.

FIG. 6 is a view schematically illustrating a configuration of a touch panel system 61 on which the present Embodiments are premised. FIG. 7 is a graph for explaining a problem of the touch panel system 61. Identical reference numerals are given to components identical to those described with reference to FIG. 1. Detailed description of such components is not repeated below.

The touch panel system 61 includes a touch panel 52 and a touch panel controller 63. The touch panel controller 63 includes differential amplifiers 55. Each of the differential amplifiers 55 amplifies a difference between linear sums which are supplied from corresponding respective adjacent sense lines. Each of the differential amplifiers 55 is provided with a pair of integral capacitors Cint which correspond to the corresponding respective adjacent sense lines. Note that, for easy explanation, FIG. 6 merely illustrates a differential amplifier 55 connected to sense lines SL3 and SL4. As with the driving section 54 illustrated in FIG. 1, a driving section 54 illustrated in FIG. 6 drives drive lines DL1 through DL4 according to the Hadamard matrix of 4 rows×4 columns which his created by Sylvester method (see FIG. 2).

The inventors of the present invention found a problem that in a case where the drive lines DL1 through DL4 are driven according the Hadamard matrix of 4 rows×4 columns created by Sylvester method, an output from the differential amplifier 55 becomes extraordinarily larger (i) during the first driving time period T1 during which the driving section 54 drives all the drive lines DL1 through DL4 according to the Hadamard matrix by applying a voltage Vdrive to the drive lines DL1 through DL4 than (ii) during the second driving time period and subsequent driving time periods. The output results in exceeding a measurable range (see FIG. 7).

According to the configuration of the touch panel system 61 (see FIG. 6), the driving section 54 applies a voltage Vdrive to all the drive lines DL1 through DL4 in the first driving of four drivings based on the orthogonal code sequence that is the Hadamard matrix created by Sylvester method. This causes the differential amplifier 55 connected to the sense lines SL3 and SL4 to output a linear sum represented by Expression 18 below. In the second driving of the four drivings, the driving section 54 applies a voltage Vdrive to the drive lines DL1 and DL3, while applying a voltage −Vdrive to the drive lines DL2 and DL4. This causes the differential amplifier 55 to output a linear sum represented by Expression 19 below.

[Math. 3]

$$1^{st} \text{ vector } \frac{(C_{41}+C_{42}+C_{43}+C_{44})Vdrive}{C_{int}} - $$
$$\frac{(C_{31}+C_{32}+C_{33}+C_{34})Vdrive}{C_{int}} = $$
$$\frac{((C_{41}-C_{31})+(C_{42}-C_{32})+(C_{43}-C_{33})+(C_{44}-C_{34}))Vdrive}{C_{int}}$$

(Expression 18)

$$2^{nd} \text{ vector } \frac{(C_{41}-C_{42}+C_{43}-C_{44})Vdrive}{C_{int}} - $$
$$\frac{(C_{31}-C_{32}+C_{33}-C_{34})Vdrive}{C_{int}} = $$
$$\frac{((C_{41}-C_{31})-(C_{42}-C_{32})+(C_{43}-C_{33})-(C_{44}-C_{34}))Vdrive}{C_{int}}$$

(Expresssion 19)

Specifically, in a case where the driving section 54 applies a voltage Vdrive to all the drive lines DL1 through DL4, the differential amplifier 55 outputs a linear sum of values which are obtained by subtracting, from respective capacitance values of electrostatic capacitors which are connected to the sense line SL4, respective capacitance values of electrostatic capacitors which are connected to the sense line SL3 (see Expression 18 above).

The touch panel 52 is produced such that capacitance values of all electrostatic capacitors provided in the touch panel 52 equal to one another. Therefore, the capacitance values of all the electrostatic capacitors are supposed to equal to one another. Further, in a case where the drive lines are driven while the touch panel 52 is not being touched by a finger, a pen or the like, the differential amplifier 55 is supposed to output a linear sum of 0 (zero).

In reality, however, the capacitance values of the electrostatic capacitors provided in the touch panel 52 vary due to a production process. If the capacitance values vary at random, the capacitance values are to be offset each other due to diversification of combinations of addition and subtraction. It is therefore not supposed that an increase in a voltage of a voltage pattern is observed at a specific timing (see FIG. 7). On the contrary, the inventors of the present invention found experimentally that an output from the differential amplifier 55 tended to become extraordinarily large only during the first driving time period T1 during which the driving section 54 drives all the drive lines DL1 through DL4 according to the Hadamard matrix. Such an tendency is beyond explanation.

It is considered that electrostatic capacitors which belong to each of the sense lines have a sense line dependency in which capacitance values of the electrostatic capacitors are not identical with one another but vary linearly along a longitudinal direction of the drive lines due to, for example, (i) a parasitic capacitance and a parasitic component of a substrate on which the sense lines are provided and (ii) a pattern in which the sense lines are extended. In a case where the electrostatic capacitors in the touch panel 52 thus have the sense line dependency, the output from the differential amplifier 55 can become extraordinarily large during the first driving during which the driving section 54 drives all the drive lines DL1 through DL4 according to the Hadamard matrix created by Sylvester method by applying a voltage Vdrive to the drive lines DL1 through DL4. Such a phenomenon frequently occurs in a case where a produced touch panel is actually measured. An object of the present invention is to solve the problem.

Embodiment 1

Figure 8:
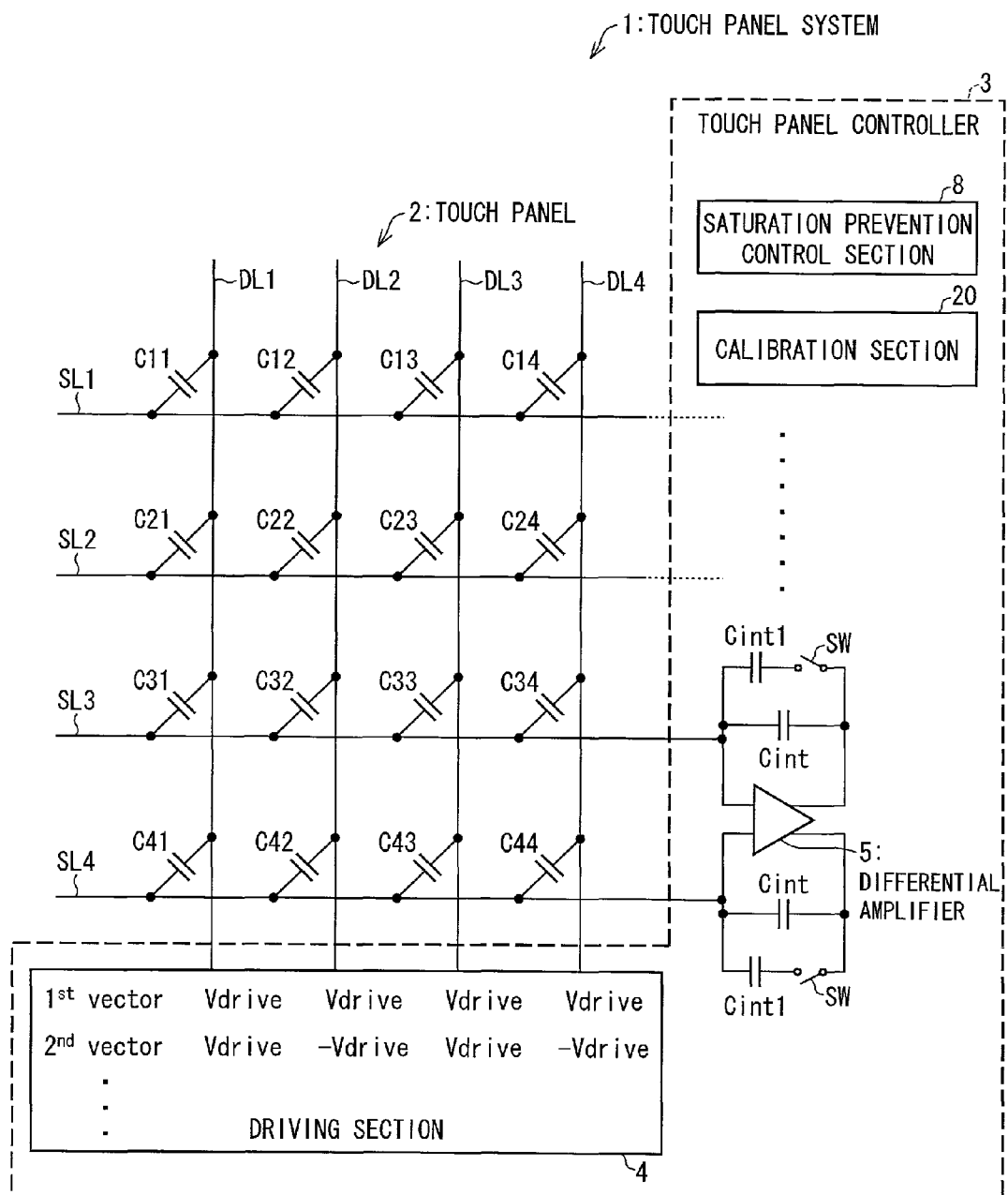
FIG. 8 is a view schematically illustrating a configuration of a touch panel system of Embodiment 1.

FIG. 8 is a view schematically illustrating a configuration of a touch panel system 1 of Embodiment 1. Identical reference numerals are given to components identical to those described with reference to FIG. 1. Detailed description of such components is not repeated below.

The touch panel system 1 includes a touch panel 2 and a touch panel controller 3. The touch panel controller 3 includes a driving section 4. As with the driving section 54 illustrated in FIG. 1, the driving section 4 illustrated in FIG. 8 drives drive lines DL1 through DL4 according to the Hadamard matrix of 4 rows×4 columns created by Sylvester method (see Expression 7 in FIG. 2).

The touch panel controller 3 includes differential amplifiers 5. Each of the differential amplifiers 5 amplifies a difference between linear sums which are supplied from corresponding respective adjacent sense lines. Each of the differential amplifiers 5 is provided with a pair of integral capacitors Cint which correspond to the corresponding respective adjacent sense lines. Note that, for easy explanation, FIG. 8 merely illustrates a differential amplifier 5 which is connected to sense lines SL3 and SL4. The sense line SL3 is connected to electrostatic capacitors C31, C32, C33, and C34 (a plurality of first electrostatic capacitors). The sense line SL4 is connected to electrostatic capacitors C41, C42, C43, and C44 (a plurality of second electrostatic capacitors).

The differential amplifier 5 is also provided with an integral capacitor Cint1 and a switch SW which are provided in parallel with the integral capacitor Cint which corresponds to the sense line SL3. The integral capacitor Cint1 and the switch SW are connected in series with each other. The differential amplifier 5 is also provided with an integral capacitor Cint1 and a switch SW which are provided in parallel with the integral capacitor Cint which corresponds to the sense line SL4.

The touch panel controller 3 includes a saturation prevention control section 8 (saturation preventing means, correction means). The saturation prevention control section 8 prevents the differential amplifier 5 from being saturated with linear sums which are supplied from the respective sense lines SL3 and SL4. The saturation prevention control section 8 prevents the saturation of the differential amplifier 5 in such a way that, when the driving section 4 drives the drive lines DL1 through DL4 by applying an identical voltage Vdrive to the drive lines DL1 through DL4 according to the orthogonal code sequence that is the Hadamard matrix created by Sylvester method, the saturation prevention control section 8 controls the switches SW to be turned on so that an integral capacitance of the differential amplifier 5 is doubled and a gain of the differential amplifier 5 is halved.

Note that Embodiment 1 has described an example case where (i) electrostatic capacitors of the touch panel 2 have a sense line dependency and (ii) the gain is halved in a case where the driving section 4 drives the drive lines according to the orthogonal code sequence by applying an identical voltage Vdrive to the drive lines. The present invention is, however, not limited to the example case. The integral capacitance of the differential amplifier 5 can be doubled and the gain can be halved by causing the switches SW to be turned on so that the differential amplifier 5 is prevented from being saturated, in a case where the electrostatic capacitors of the touch panel 2 have a drive line dependency, and (i) the driving section 4 drives M drive lines by applying a first voltage to odd-numbered drive lines of the M drive lines and by applying, to even-numbered drive lines of the M drive lines, a second voltage which is equal in absolute value but opposite in sign to the first voltage or (ii) the driving section 4 drives the M drive lines according to a code sequence by applying the first voltage to the first through the $[M/2]^{th}$ drive lines (where x in [x] is a positive integer) of the M drive lines and by applying the second voltage to the $([M/2]+1)^{th}$ through the $M^{th}$ drive lines of the M drive lines. The same applies to later-described Embodiments.

Note that, strictly speaking, in a case where the electrostatic capacitors have both the drive line dependency and the sense line dependency, the differential amplifier 5 tends to be saturated. According to FIG. 8 and Expression 19 above, for example, in a case where in Expression 19, (i) $(C_{41}-C_{31})>0$, $(C_{43}-C_{33})>0$, $(C_{42}-C_{32})<0$, and $(C_{44}-C_{34})<0$ or (ii) $(C_{41}-C_{31})>0$, $(C_{43}-C_{33})>0$, $(C_{42}-C_{32})=0$, and $(C_{44}-C_{34})=0$, the differential amplifier 5 tends to be saturated with a $2^{nd}$ vector which is used to drive the drive lines by applying the first voltage to the odd-numbered drive lines and by applying the second voltage to the even-numbered drive lines.

On the other hand, for example, in a case where $(C_{41}-C_{31})>0$, $(C_{43}-C_{33})>0$, $(C_{42}-C_{32})>0$, and $(C_{44}-C_{34})>0$ in Expression 19, (i) $(C_{41}-C_{31})$ and $(C_{43}-C_{33})$ are offset each other and (ii) $(C_{42}-C_{32})$ and $(C_{44}-C_{34})$ are offset each other (see Expression 19). In this case, the differential amplifier 5 does not tend to be saturated.

Expression 20 below represents an output from a conventional differential amplifier 5 due to the first driving based on the Hadamard matrix. Expression 21 below represents an output from the differential amplifier 5 of Embodiment 1. The first term and the second term in the first expression of Expression 21 correspond to respective "first linear sum" and "second linear sum" which are defined in the claims of the subject application.

[Math. 4]

$1^{st}$ vector (conventional) (Expression 20)

$$\frac{(C_{41}+C_{42}+C_{43}+C_{44})Vdrive}{C_{int}} - \frac{(C_{31}+C_{32}+C_{33}+C_{34})Vdrive}{C_{int}} = \frac{((C_{41}-C_{31})+(C_{42}-C_{32})+(C_{43}-C_{33})+(C_{44}-C_{34}))Vdrive}{C_{int}}$$

$1^{st}$ vector (Embodiment 1) (Expression 21)

$$\frac{(C_{41}+C_{42}+C_{43}+C_{44})Vdrive}{2C_{int}} - \frac{(C_{31}+C_{32}+C_{33}+C_{34})Vdrive}{2C_{int}} = \frac{((C_{41}-C_{31})+(C_{42}-C_{32})+(C_{43}-C_{33})+(C_{44}-C_{34}))Vdrive}{2C_{int}}$$

The output from the differential amplifier 5 due to the first driving based on the Hadamard matrix, in which differential amplifier 5 the gain is halved, is to be compensated by being amplified double in a signal processing circuit (not illustrated).

The touch panel controller 3 includes a calibration section 20 (correction means). The calibration section 20 measures an output level of the differential amplifier 5 in order to calibrate the touch panel controller 3. On the basis of a measurement result brought by the calibration section 20, the saturation prevention control section 8 carries out the foregoing operation in actual use of the touch panel 2 so as to prevent the differential amplifier 5 from being saturated.

Note that the above has described an example case where the gain is halved. The present invention is, however, not limited to the example case. The gain does not need to be halved, provided that the differential amplifier 5 is not saturated.

FIG. 9 is an explanatory view for describing an SN ratio of the touch panel system 1. Assume that noises Noise1 through Noise4 (see Expression 22 in FIG. 9) are uncorrelated with one another (the noises do not fluctuate even if a gain is decreased). On the assumption, noises, which are obtained in a case of a first method of driving all the drive lines according to the orthogonal code sequence of Embodiment 1, become $(7/16)^{1/2}$ as large as those obtained in a case of a second method of driving the drive lines one by one (see Expressions 24 and 25 in FIG. 9). In terms of this, the first method is more advantageous than the second method.

Note that Embodiment 1 has described an example case where the drive lines are driven according to an order from the first row of the orthogonal code sequence that is the Hadamard matrix. The present invention is, however, not limited to the example case. The drive lines can be driven according to an order from the last row of the Hadamard matrix. Alternatively, the drive lines can be driven according to an order of rows which are arbitrarily arranged. The same applies to later-described Embodiments.

Note also that Embodiment 1 has described an example case where the drive lines are driven according to the orthogonal code sequence. The present invention is, however, not limited to the example case. The drive lines can be driven according to a code sequence other than the orthogonal code sequence, such as a code sequence based on an M sequence. The same applies to later-described Embodiments. Note, however, that driving according to the orthogonal code sequence brings an SN ratio larger than that brought by driving according to the code sequence based on the M sequence.

Figure 10:
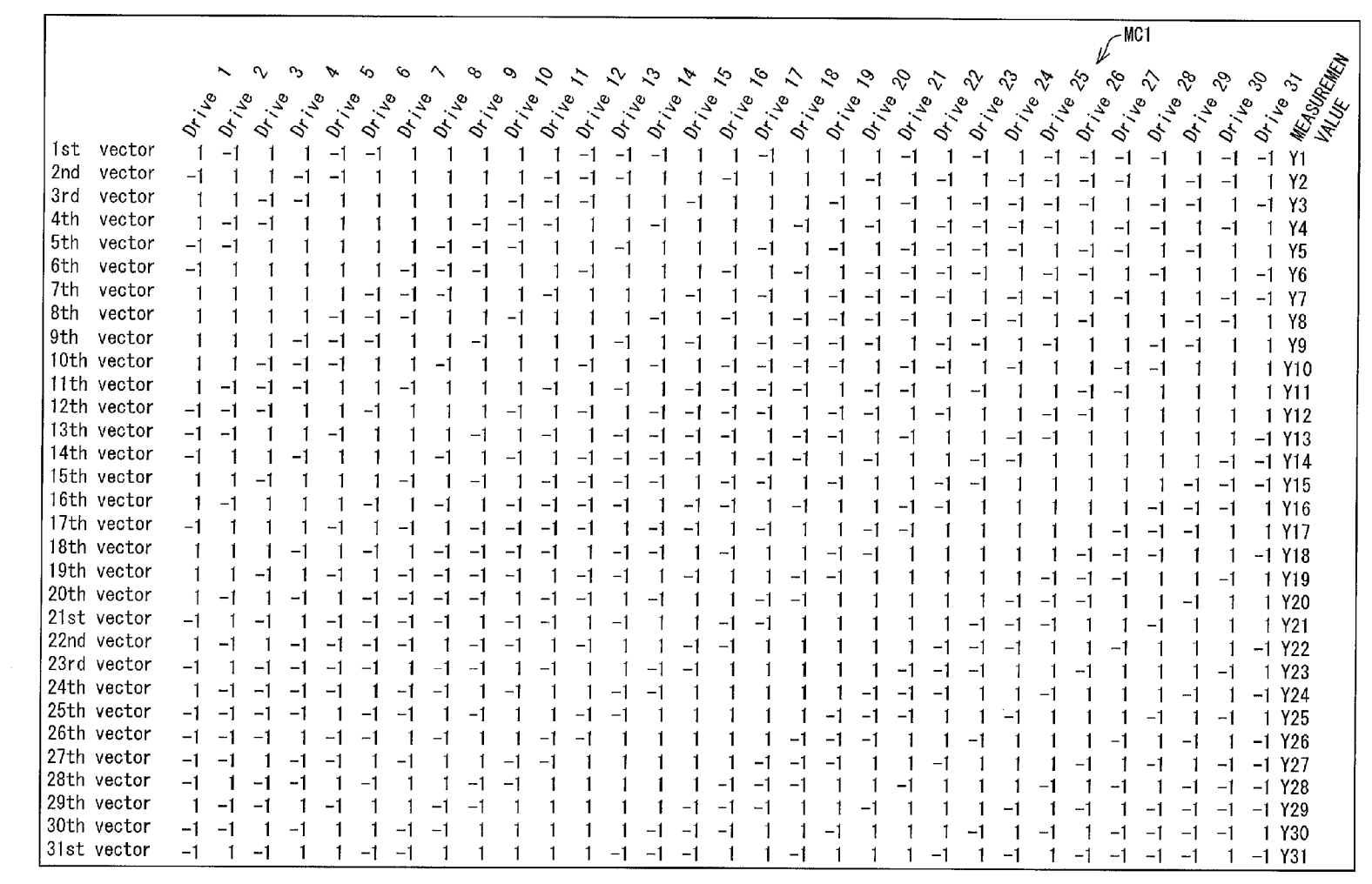
Figure 11:
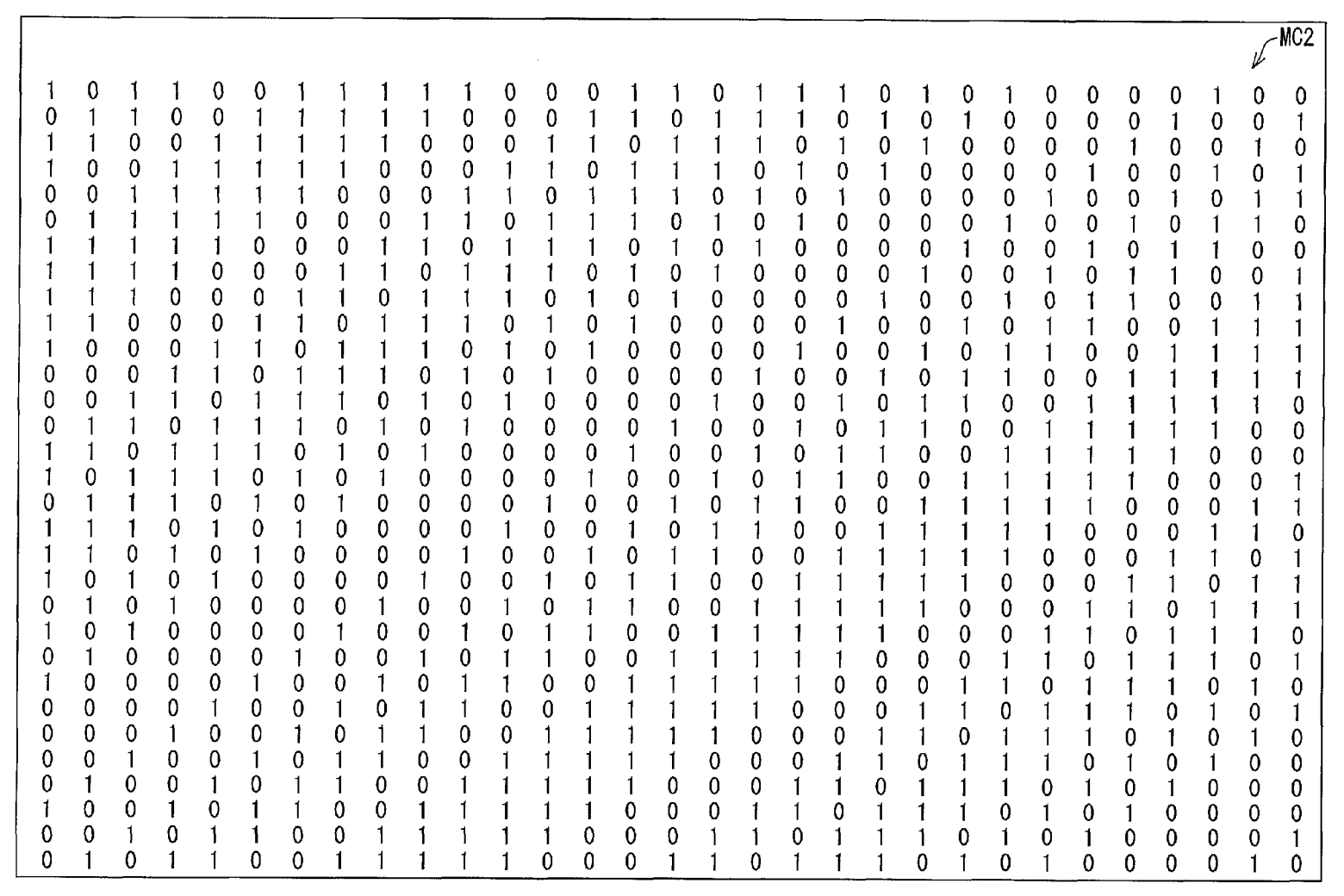
Figure 12:
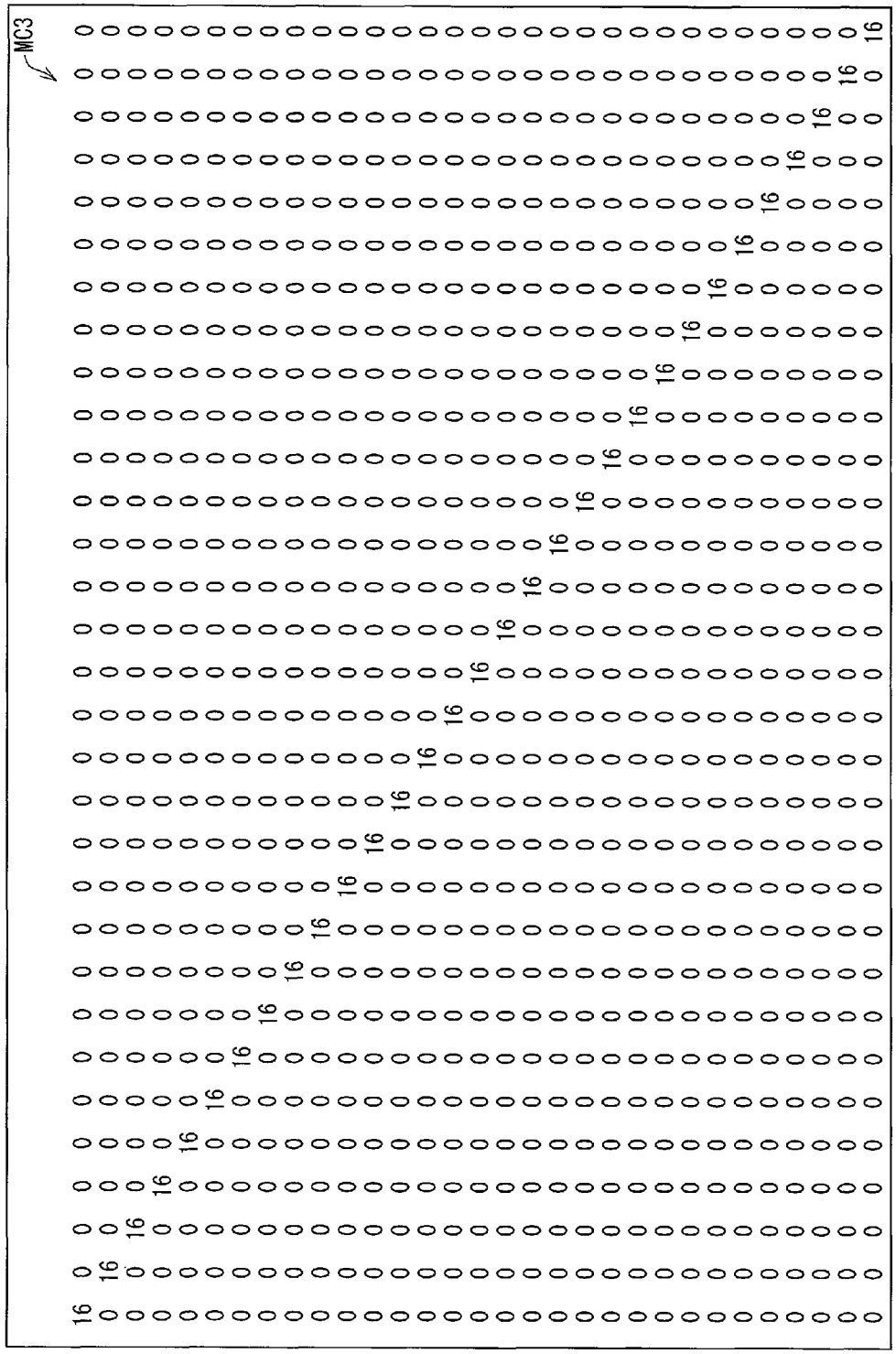
FIG. 12 is a view illustrating a result obtained by calculating inner products of measurement values and the decode matrix.

FIG. 10 is a view illustrating an M-sequence code MC1 according to which the touch panel system 1 is driven. FIG. 11 is a view illustrating a decode matrix MC2 according to which capacitance values of electrostatic capacitors which have been driven according to the M-sequence code MC1 are decoded. FIG. 12 is a view illustrating a matrix MC3 obtained by calculating inner products of measurement values and the decode matrix MC2.

The M-sequence code MC1 is a matrix of 31 rows×31 columns. According to the M-sequence code MC1, each of 31 drive lines is driven 31 times with the use of respective 1st through 31st vectors. As a result of the driving, measurement values Y1 through Y31 are obtained. An element "1" in the M-sequence code MC1 means that +V volt is applied to the drive lines. An element "0" is represented by "−1" in FIG. 10. The element "−1" in the M-sequence code MC1 means that −V volt is applied to the drive lines.

The decode matrix MC2, according to which capacitance values of electrostatic capacitors which have been driven according to the M-sequence code MC1 are decoded, is a matrix of 31 rows×31 columns. The matrix MC3 (see FIG. 12) is obtained by calculating inner products of the measurement values Y1 through Y31 and the decode matrix MC2.

In a case where the drive lines are driven according to the M-sequence code, capacitance values are estimated on the basis of 16 pieces of data of the measurement values. In this case, signal components are 16 times as many as those obtained in a case where the Hadamard code that is the orthogonal code sequence is employed, and noise components are 4 times as many as those obtained in the case where the Hadamard code is employed on an assumption that the noise components are uncorrelated with one another. This corresponds to a case where 16 vectors in the Hadamard code are used. Though the number of vectors is thus 31 in a case where the M-sequence code is employed, the signal components and the noise components, obtained in the case where the M-sequence code is employed, are the same as those obtained in the case where 16 vectors in the Hadamard code are used. Therefore, a larger SN ratio is obtained in the case where the orthogonal code sequence is employed than in the case where the M-sequence code is employed.

Embodiment 2

Figure 13:
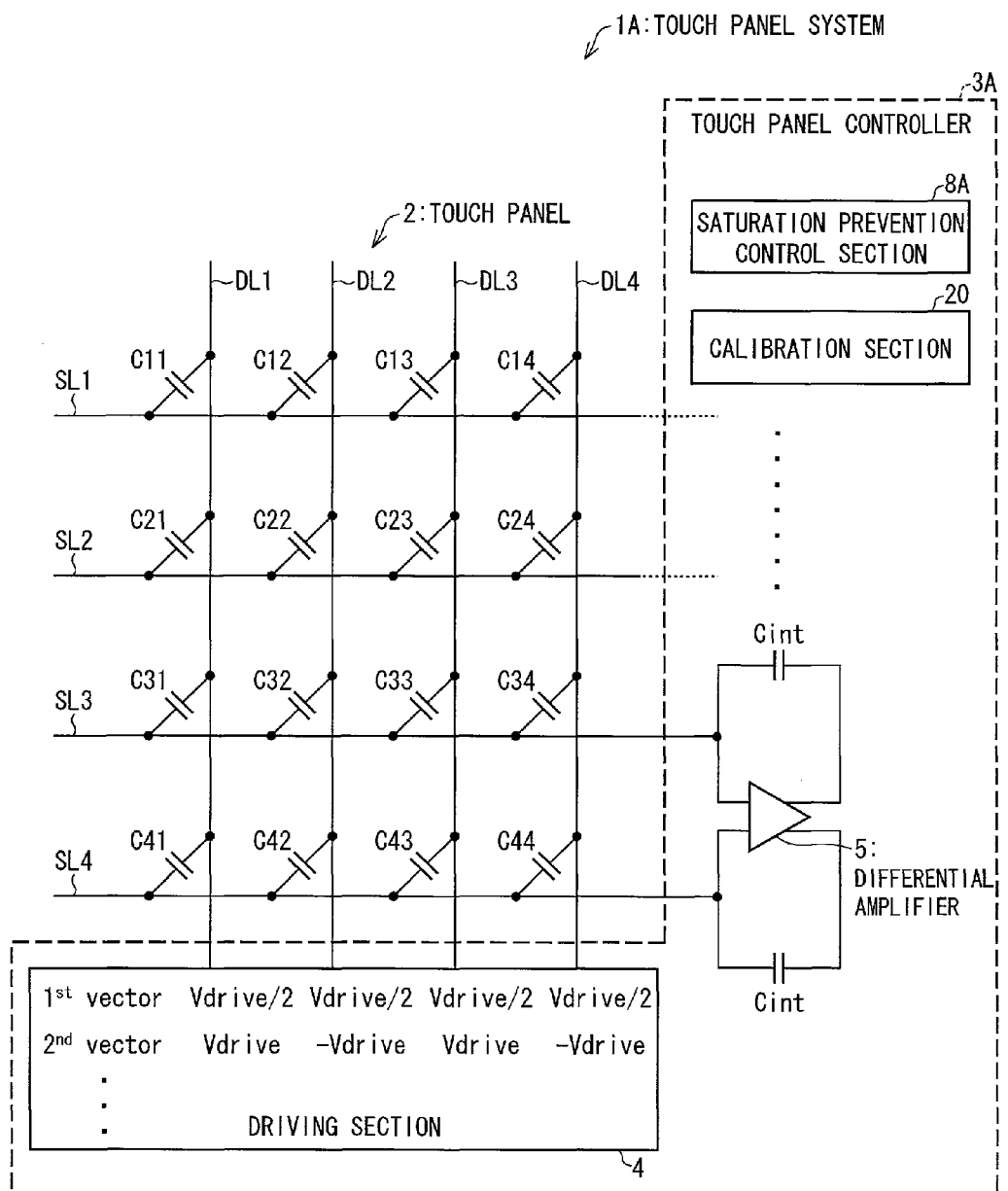
FIG. 13 is a view schematically illustrating a configuration of a touch panel system of Embodiment 2.

FIG. 13 is a view schematically illustrating a configuration of a touch panel system 1A of Embodiment 2. Identical reference numerals are given to components identical to those described above. Detailed description of such components is not repeated below.

The touch panel system 1A includes a touch panel controller 3A. The touch panel controller 3A includes a saturation prevention control section 8A. The saturation prevention control section 8A controls a driving section 4 to apply a voltage Vdrive/2, instead of a voltage Vdrive, to drive lines DL1 through DL4 in the first driving of four drivings based on the Hadamard matrix of 4 rows×4 columns created by Sylvester method (see Expression 7 in FIG. 2).

Expression 26 below represents an output from the conventional differential amplifier 5 due to the first driving. Expression 27 below represents an output from a differential amplifier 5 of Embodiment 2.

[Math. 5]

$$\begin{aligned}&1^{st}\text{ vector (conventional)} \quad \text{(Expression 26)}\\&\frac{(C_{41}+C_{42}+C_{43}+C_{44})Vdrive}{C_{int}}-\\&\frac{(C_{31}+C_{32}+C_{33}+C_{34})Vdrive}{C_{int}}=\\&\frac{((C_{41}-C_{31})+(C_{42}-C_{32})+(C_{43}-C_{33})+(C_{44}-C_{34}))Vdrive}{C_{int}}\end{aligned}$$

$$\begin{aligned}&1^{st}\text{ vector (Embodiment 2)} \quad \text{(Expression 27)}\\&\frac{(C_{41}+C_{42}+C_{43}+C_{44})Vdrive/2}{C_{int}}-\\&\frac{(C_{31}+C_{32}+C_{33}+C_{34})Vdrive/2}{C_{int}}=\\&\frac{((C_{41}-C_{31})+(C_{42}-C_{32})+(C_{43}-C_{33})+(C_{44}-C_{34}))Vdrive}{2C_{int}}\end{aligned}$$

By thus applying a reduced driving voltage to the drive lines in the first driving based on the Hadamard matrix, it is possible to prevent the differential amplifier 5 from being saturated. The output from the differential amplifier 5, which output is obtained in a case where the drive lines are driven with a halved driving voltage, is to be compensated by being amplified double in a signal processing circuit (not illustrated).

Note that Embodiment 2 has described an example case where the drive lines are driven with the halved driving voltage. The present invention is, however, not limited to the example case. A driving voltage does not necessarily need to be halved, provided that the differential amplifier 5 is not saturated.

Embodiment 3

Figure 14:
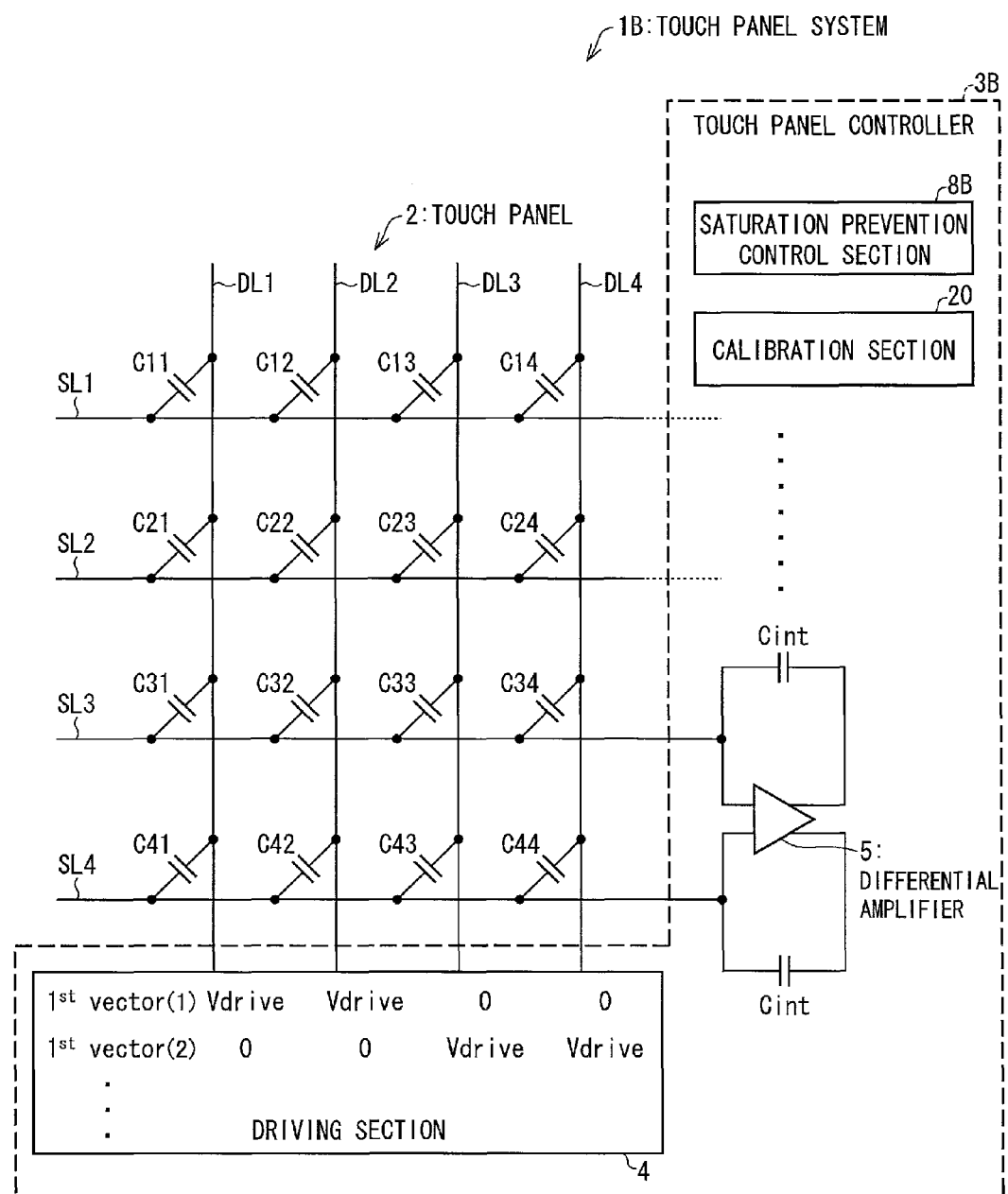
FIG. 14 is a view schematically illustrating a configuration of a touch panel system of Embodiment 3.

FIG. 14 is a view schematically illustrating a configuration of a touch panel system 1B of Embodiment 3. FIG. 15 is an explanatory view for describing an SN ratio of the touch panel system 1B. Identical reference numerals are given to components identical to those described above. Detailed description of such components is not repeated below.

The touch panel system 1B includes a touch panel controller 3B. The touch panel controller 3B includes a saturation prevention control section 8B. The saturation prevention control section 8B controls a driving section 4 to drive lines DL1 through DL4 according to the Hadamard matrix of 4 rows×4 columns created by Sylvester method (see Expression 7 in FIG. 2) by applying an identical voltage to the drive lines DL1 through DL4 such that the drive lines DL1 and DL2 are driven separately from the drive lines DL3 and DL4.

Conventionally, for example, in the first driving of four drivings based on the orthogonal code sequence of 4 rows×4 columns, a voltage Vdrive is applied to all the drive lines DL1 through DL4. This causes the differential amplifier 5 to output a linear sum represented by Expression 28 below.

On the other hand, according to Embodiment 3, first, a voltage Vdrive is applied to the drive lines DL1 and DL2, whereas no voltage is applied to the drive lines DL3 and DL4 so that the drive lines DL3 and DL4 are not driven. This causes the differential amplifier 5 to output, as a measurement value Y1, a linear sum represented by Expression 29 below. Then, a voltage Vdrive is applied to the drive lines DL3 and DL4, whereas no voltage is applied to the drive lines DL1 and DL2 so that the drive lines DL1 and DL2 are not driven. This causes the differential amplifier 5 to output, as a measurement value Y1', a linear sum represented by Expression 30 below.

[Math. 6]

$1^{st}$ vector (conventional) (Expression 28)

$$\frac{(C_{41} + C_{42} + C_{43} + C_{44})Vdrive}{C_{int}} - \frac{(C_{31} + C_{32} + C_{33} + C_{34})Vdrive}{C_{int}} = \frac{((C_{41} - C_{31}) + (C_{42} - C_{32}) + (C_{43} - C_{33}) + (C_{44} - C_{34}))Vdrive}{C_{int}}$$

$1^{st}$ vector (1) (Expression 29)

$$\frac{(C_{41} + C_{42})Vdrive}{C_{int}} - \frac{(C_{31} + C_{32})Vdrive}{C_{int}} = \frac{((C_{41} - C_{31}) + (C_{42} - C_{32}))Vdrive}{C_{int}}$$

$1^{st}$ vector (2) (Expression 30)

$$\frac{(C_{43} + C_{44})Vdrive}{C_{int}} - \frac{(C_{33} + C_{34})Vdrive}{C_{int}} = \frac{((C_{43} - C_{33}) + (C_{44} - C_{34}))Vdrive}{C_{int}}$$

By thus driving the drive lines DL1 and DL2 separately from the drive lines DL3 and DL4 in the first driving based on the Hadamard matrix, it is possible to prevent the differential amplifier 5 from being saturated. Outputs from the differential amplifier 5 due to such a separate driving are to be compensated by being added to each other in a signal processing circuit (not illustrated).

Assume that noises Noise1, Noise1', and Noise2 through Noise4 (see Expression 31 in FIG. 15) are uncorrelated with one another. On the assumption, noises, which are obtained in a case of a first method of driving all the drive lines according to the orthogonal code sequence of Embodiment 3, become $(5/16)^{1/2}$ as large as those obtained in a case of a second method of driving the drive lines one by one (see Expressions 33 and 34 in FIG. 15). In terms of this, the first method is more advantageous than the second method.

Embodiment 4

Figure 16:
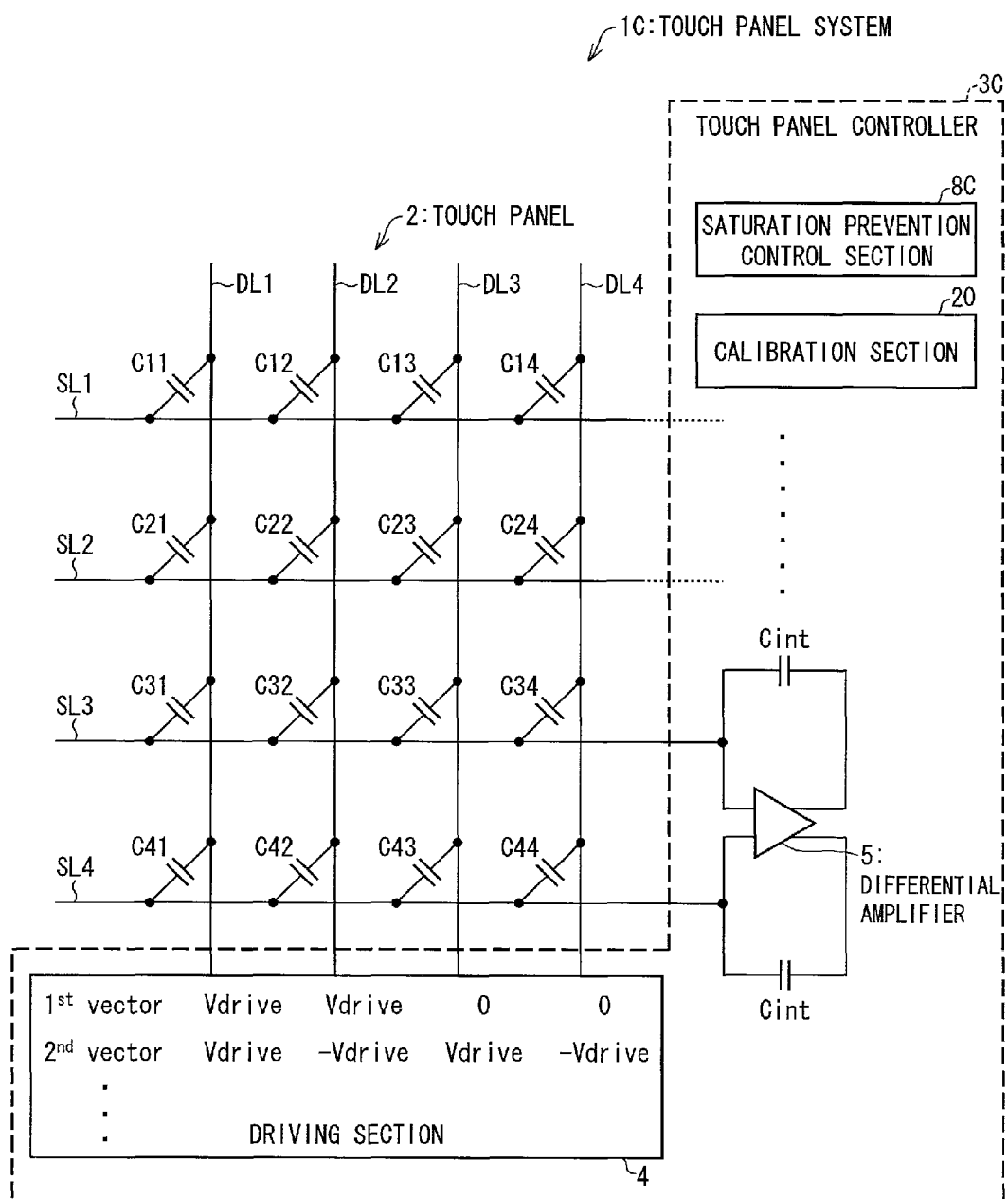
FIG. 16 is a view schematically illustrating a configuration of a touch panel system of Embodiment 4.

FIG. 16 is a view schematically illustrating a configuration of a touch panel system 1C of Embodiment 4. FIG. 17 is an explanatory view for describing an SN ratio of the touch panel system 1C. Identical reference numerals are given to components identical to those described above. Detailed description of such components is not repeated below.

According to Embodiments 1 through 3 above, the drive lines are driven according to the orthogonal code sequence that is the Hadamard matrix, and electrostatic capacitance values are calculated. The present invention is, however, not limited to this. The drive lines can be driven according to an orthogonal code sequence other than the Hadamard matrix, and the electrostatic capacitance values can be calculated.

The touch panel system 1C includes a touch panel controller 3C. The touch panel controller 3C includes a saturation prevention control section 8C. The saturation prevention control section 8C controls a driving section 4 to drive lines DL1 through DL4 according to a matrix of 4 rows×4 columns (see Expression 37 in FIG. 14) in which matrix "1" in the first row, the third column and in the first row, the fourth column of the Hadamard matrix of 4 rows×4 columns created by Sylvester method (see Expression 7 in FIG. 2) is replaced with "0".

Expression 35 below represents an output from the conventional differential amplifier 5 due to the first driving. Expression 36 below represents a measurement value Y1 to be outputted from the differential amplifier 5 of Embodiment 4.

[Math. 7]

$1^{st}$ vector (conventional) (Expression 35)

$$\frac{(C_{41} + C_{42} + C_{43} + C_{44})Vdrive}{C_{int}} - \frac{(C_{31} + C_{32} + C_{33} + C_{34})Vdrive}{C_{int}} = \frac{((C_{41} - C_{31}) + (C_{42} - C_{32}) + (C_{43} - C_{33}) + (C_{44} - C_{34}))Vdrive}{C_{int}}$$

$1^{st}$ vector (Expression 36)

$$\frac{(C_{41} + C_{42})Vdrive}{C_{int}} - \frac{(C_{31} + C_{32})Vdrive}{C_{int}} = \frac{((C_{41} - C_{31}) + (C_{42} - C_{32}))Vdrive}{C_{int}}$$

Measurement values Y1 through Y4 (see Expression 37 in FIG. 17) of Embodiment 4 are subjected to a matrix calculation represented by Expression 38 in FIG. 17. This calculates capacitance values C1 through C4 (see Expression 39 in FIG. 17).

An output from the differential amplifier 5, which output is obtained in a case where reduced-numbered drive lines are driven according to the first row of the matrix (see Expression 37 in FIG. 17), is to be compensated through a signal process carried out by a signal processing circuit (not illustrated).

Assume that noises Noise 1 through Noise4 (see Expression 40 in FIG. 17) are uncorrelated with one another. On the assumption, noises, which are obtained in a case of a first method of driving all the drive lines according to the orthogonal code sequence of Embodiment 4, become $(6/16)^{1/2}$ or $(10/16)^{1/2}$ as large as those obtained in a case of a second method of driving the drive lines one by one (see Expressions 42 and 43 in FIG. 17). In terms of this, the first method is more advantageous than the second method.

Figure 18:
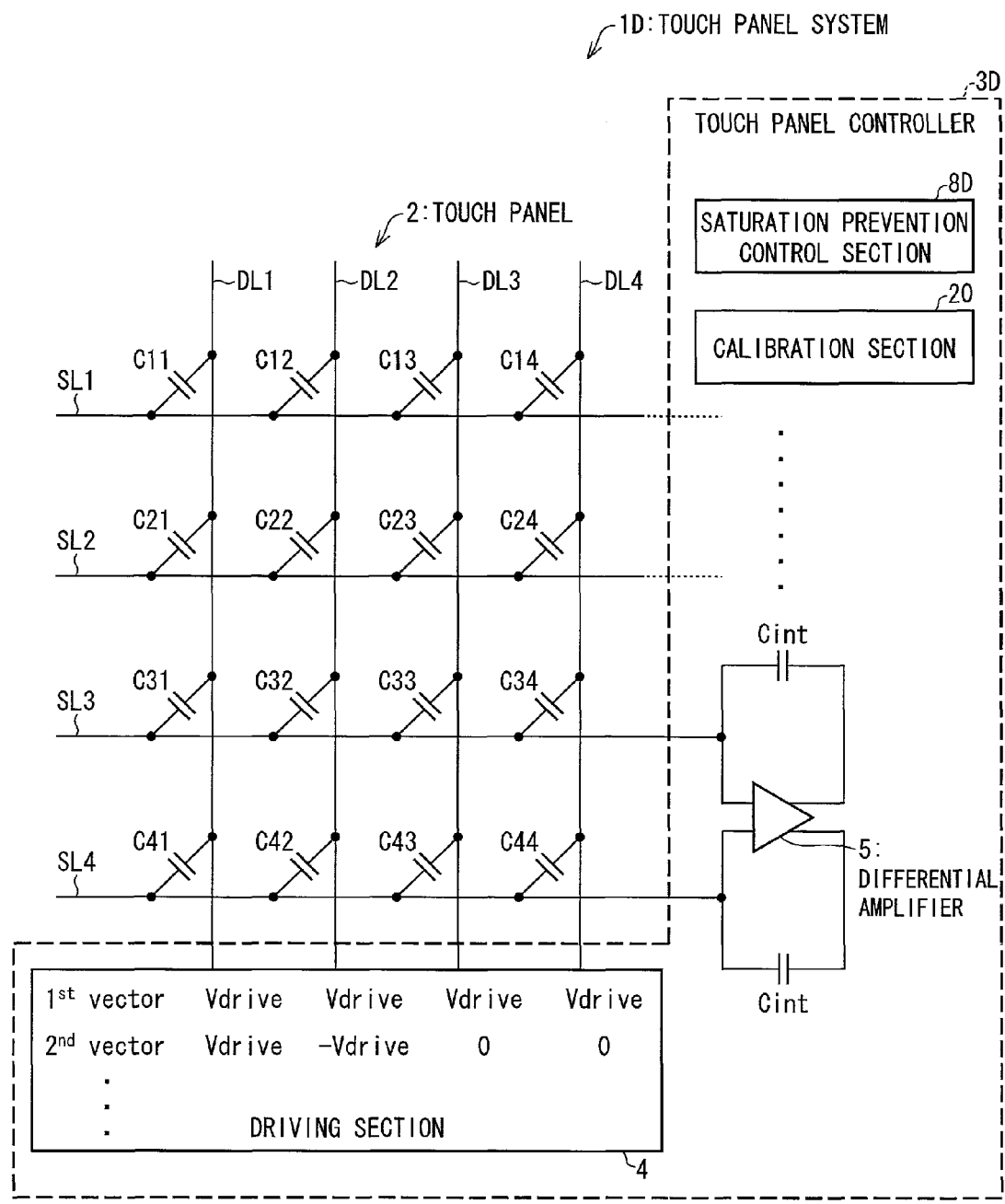
FIG. 18 is a view schematically illustrating a configuration of another touch panel system of Embodiment 4.

FIG. 18 is a view schematically illustrating a configuration of a touch panel system 1D of Embodiment 4. FIG. 19 is an explanatory view for describing an SN ratio of the touch panel system 1D. Identical reference numerals are given to components identical to those described above. Detailed description of such components is not repeated below.

"Line dependency" encompasses (i) "sense line dependency" in which capacitance values vary depending on which sense line the capacitance values belong to and (ii) "drive line dependency" in which capacitance values vary depending on which drive line the capacitance values belong to. For example, capacitance values along an odd-numbered drive line sometimes tend to differ from those along an even-numbered drive line due to a process of producing a touch panel. The touch panel causes a problem that, in a case where the odd-numbered and even-numbered drive lines are driven according to the second row (1, −1, 1, −1) of the Hadamard matrix (see Expression 7 in FIG. 2), an output from a differential amplifier 5 becomes extraordinarily large, and consequently exceeds a measurable range.

The problem can be prevented as follows: a touch panel controller 3D of the touch panel system 1D includes a saturation prevention control section 8D which controls a driving section 4 to drive lines DL1 through DL4 according to a matrix (see Expression 46 in FIG. 19) in which (i) "1" in the second row, the third column of the Hadamard matrix (see Expression 7 in FIG. 2) is replaced with "0" and (ii) "−1" in the second row, the fourth column of the Hadamard matrix is replaced with "0".

Expression 44 below represents an output from the conventional differential amplifier 5 due to a driving according to the second row of the Hadamard matrix. Expression 45 below represents a measurement value Y2 to be outputted from a differential amplifier 5 (illustrated in FIG. 18) in a case of driving according to the matrix of 4 rows×4 columns (see Expression 46 in FIG. 19).

[Math. 8]

$2^{nd}$ vector (conventional)     (Expression 44)

$$\frac{(C_{41} - C_{42} + C_{43} - C_{44})Vdrive}{C_{int}} - \frac{(C_{31} - C_{32} + C_{33} - C_{34})Vdrive}{C_{int}} = \frac{((C_{41} - C_{31}) - (C_{42} - C_{32}) + (C_{43} - C_{33}) - (C_{44} - C_{34}))Vdrive}{C_{int}}$$

$2^{nd}$ vector     (Expression 45)

$$\frac{(C_{41} - C_{42})Vdrive}{C_{int}} - \frac{(C_{31} - C_{32})Vdrive}{C_{int}} = \frac{((C_{41} - C_{31}) - (C_{42} - C_{32}))Vdrive}{C_{int}}$$

Measurement values Y1 through Y4 (see Expression 46 in FIG. 19) of Embodiment 4 are subjected to a matrix calculation represented by Expression 47 in FIG. 19. This calculates capacitance values C1 through C4 (see Expression 48 in FIG. 19).

An output from the differential amplifier 5, which output is obtained in a case where reduced-numbered drive lines are driven according to the second row of the matrix (see Expression 46 in FIG. 19), is to be compensated through a signal process carried out by a signal processing circuit (not illustrated).

In a case where there exists a line dependency between (i) the first through the $(M/2)^{th}$ drive lines (left half) of M drive lines and (ii) the $(M/2+1)^{th}$ through the $M^{th}$ drive lines (right half) of the M drive lines, the differential amplifier 5 is easily saturated with signals by applying voltages "1, 1, 1, . . . , 1 $((M/2)^{th})$, −1, −1, . . . , −1" to the respective M drive lines so that the M drive lines are driven.

For example, in a case where there exists a line dependency between (i) the first and the second drive lines of four drive lines and (ii) the third and the fourth drive lines of the four drive lines, the differential amplifier 5 is easily saturated with signals by applying voltages "1, 1, −1, −1" to the respective four drive lines so that the four drive lines are driven.

In order to prevent the differential amplifier 5 from being saturated, the four drive lines need to be driven according to a matrix in which "−1", in the third row, the third column and in the third row, the fourth column of the Hadamard matrix (see Expression 7 of FIG. 2), is replaced with "0".

Embodiment 5

FIG. 20 is an explanatory view for describing a code sequence according to which a touch panel system of Embodiment 5 is driven. (a) of FIG. 20 illustrates a conventional driving method. (b) of FIG. 20 illustrates a driving method of Embodiment 5.

Embodiments 1 through 4 have described an example case where the drive lines are driven according to the Hadamard matrix of 4 rows×4 columns created by Sylvester method. The present invention is, however, not limited to the example case. The drive lines can be driven according to a matrix of 3 rows×3 columns. However, in a case where (i) there exists a sense line dependency and (ii) a matrix of 3 rows×3 columns includes a row in which all elements are "1" (see Expression 53 in (a) of FIG. 20), an output from a differential amplifier becomes extraordinarily large, and consequently exceeds a measurable range, as early described.

In order to prevent the differential amplifier from being saturated, the drive lines are driven according to a matrix, such as a matrix of 3 rows×3 columns (see Expression 56 in (b) of FIG. 20), which does not have a pattern (i) in which all elements are "1" and (ii) which causes the differential amplifier to be saturated.

Further, in a case where (i) there exists a drive line dependency between an odd-numbered drive line and an even-numbered drive line and (ii) elements are "1, −1, 1", an output from the differential amplifier becomes extraordinarily large, and consequently exceeds the measurable range. In order to prevent the differential amplifier from being saturated, the drive lines are driven according to a matrix which does not have a pattern (i) in which the elements are "1, −1, 1" and (i) which causes the differential amplifier to be saturated.

The following describes a case where there exists a drive line dependency between right-half drive lines and left-half drive lines of drive lines. In a case where (i) there exists a drive line dependency between the first through the $[M/2]^{th}$ drive lines (where x in [x] is a positive integer) of M drive lines and the $[M/2+1]^{th}$ through the $M^{th}$ drive lines of the M drive lines, (ii) the first through the $[M/2]^{th}$ elements in a code sequence equal to "1" and (iii) the $[M/2+1]^{th}$ through the $M^{th}$ elements in the code sequence equal to "−1", an output from a differential amplifier becomes extraordinarily large, and consequently exceeds a measurable range. In order to prevent the differential amplifier from being saturated, the M drive lines are driven according to a matrix which does not have a pattern (i) in which the first through the $[M/2]^{th}$ elements are "1" and the $[M/2+1]^{th}$ through the $M^{th}$ elements are "−1" and (ii) which causes the differential amplifier to be saturated.

Embodiment 6

Figure 21:
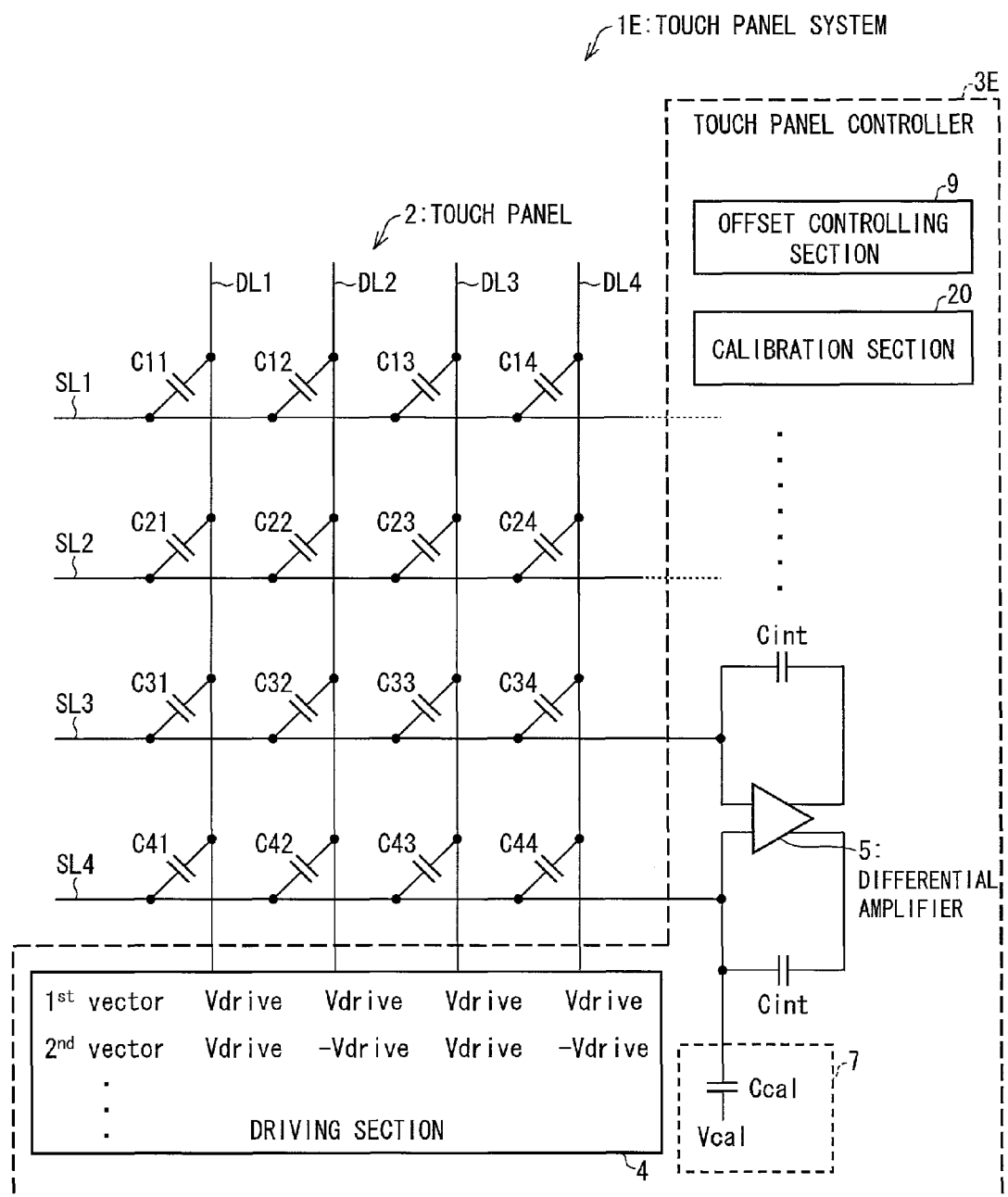
FIG. 21 is a view schematically illustrating a configuration of a touch panel system of Embodiment 6.

FIG. 21 is a view schematically illustrating a configuration of a touch panel system 1E of Embodiment 6. Identical reference numerals are given to components identical to those described above. Detailed description of such components is not repeated below.

The touch panel system 1E includes a touch panel controller 3E. The touch panel controller 3E includes a correction circuit 7 for correcting a difference between (i) capacitance values of electrostatic capacitors C31, C32, C33, and C34 which are connected to a sense line SL3 and (ii) capacitance values of electrostatic capacitors C41, C42, C43, and C44 which are connected to a sense line SL4. The correction circuit 7 is connected to a differential amplifier 5 on a sense line SL4 side.

The correction circuit 7 includes a correction capacitor Ccal having a first terminal which is connected to an input terminal of the differential amplifier 5, to which input terminal the sense line SL4 is connected. The correction capacitor Ccal has a second terminal different from the first terminal, to which second terminal a correction voltage Vcal generated by a DA converter (not illustrated) is applied.

The touch panel controller 3E includes a calibration section 20. In a case where the touch panel controller 3E is calibrated, the calibration section 20 measures an output level of the differential amplifier 5, and adjusts the correction circuit 7 on the basis of a result of the measurement. Specifically, the calibration section 20 adjusts the correction circuit 7 by discretely changing a capacitance value of the correction capacitor Ccal while keeping the correction voltage Vcal fixed. Alternatively, the calibration section 20 may be configured to adjust the correction circuit 7 by discretely changing the correction voltage Vcal while keeping the capacitance value of the correction capacitor Ccal fixed. As a further alternative, the calibration section 20 may be configured to adjust the correction circuit 7 by changing both the capacitance value of the correction capacitor Ccal and the correction voltage Vcal.

The touch panel controller 3E includes an offset controlling section 9 (offset means, correction means). The offset controlling section 9 controls the correction circuit 7 to operate in a case where (i) the touch panel controller 3E controls a touch panel 2 and (ii) a driving section 4 drives four drive lines according to an orthogonal code sequence by applying an identical voltage to the four drive lines.

Expression 59 below represents an output from the conventional differential amplifier 5 due to the first driving. Expression 60 below represents a measurement value Y1 to be outputted from the differential amplifier 5 to which the correction circuit 7 of Embodiment 6 is connected.

[Math. 9]

$$1^{st} \text{ vector (conventional)} \quad \text{(Expression 59)}$$
$$\frac{(C_{41} + C_{42} + C_{43} + C_{44})Vdrive}{C_{int}} - \frac{(C_{31} + C_{32} + C_{33} + C_{34})Vdrive}{C_{int}} =$$
$$\frac{((C_{41} - C_{31}) + (C_{42} - C_{32}) + (C_{43} - C_{33}) + (C_{44} - C_{34}))Vdrive}{C_{int}}$$

$$1^{st} \text{ vector (Embodiment6)} \quad \text{(Expresssion 60)}$$
$$\frac{(C_{41} + C_{42} + C_{43} + C_{44})Vdrive}{C_{int}} - \frac{(C_{31} + C_{32} + C_{33} + C_{34})Vdrive}{C_{int}} + \frac{(C_{cal})V_{cal}}{C_{int}} =$$
$$\frac{((C_{41} - C_{31}) + (C_{42} - C_{32}) + (C_{43} - C_{33}) + (C_{44} - C_{34}))Vdrive + C_{cal}V_{cal}}{C_{int}}$$

Embodiment 7

Figure 22:
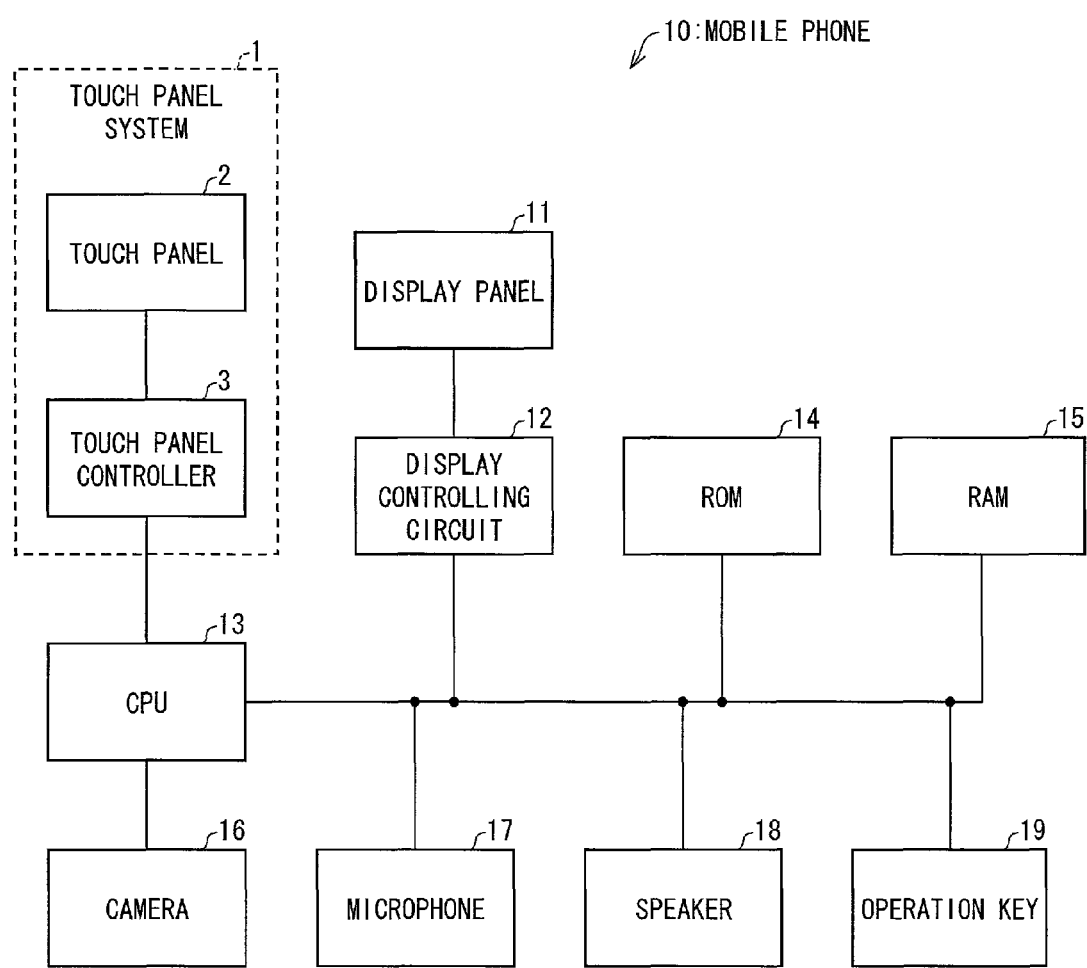
FIG. 22 is a block diagram illustrating a configuration of a mobile phone which includes a touch panel system of Embodiment 7.
Figure 23:
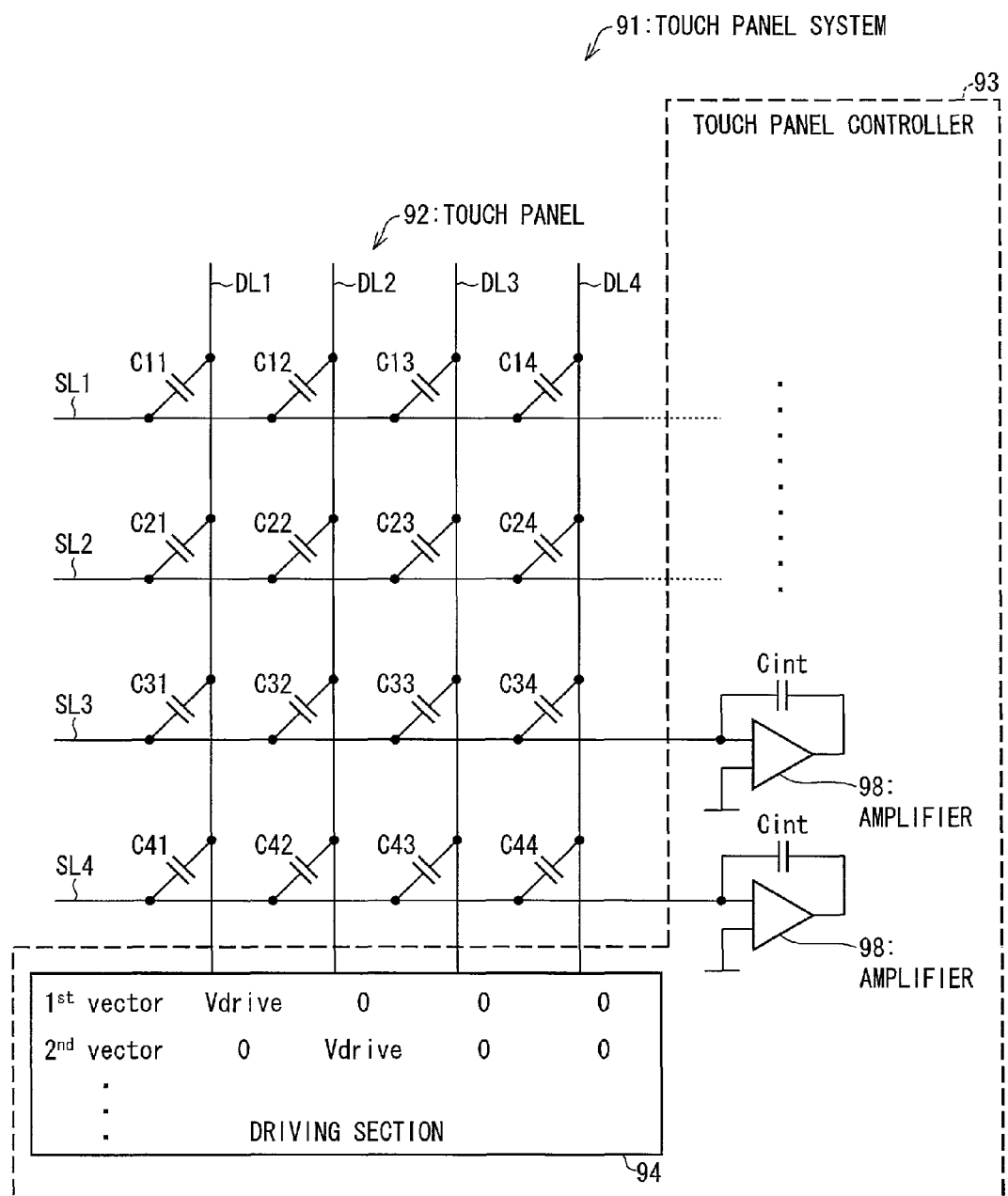
FIG. 23 is a view schematically illustrating a configuration of a conventional touch panel system.

FIG. 22 is a block diagram illustrating a configuration of a mobile phone 10 (electronic apparatus) which includes a touch panel system 1 of Embodiment 7. The mobile phone 10 includes a CPU 13, a RAM 15, a ROM 14, a camera 16, a microphone 17, a speaker 18, an operation key 19, a display panel 11, a display controlling circuit 12, and the touch panel system 1. These components are connected to each other via a data bus.

The CPU 13 controls an operation of the mobile phone 10. The CPU executes a program stored in, for example, the ROM 14. A user of the mobile phone 10 enters an instruction via the operation key 19. The RAM 15 is a volatile memory which stores therein (i) data generated by executing of a program by the CPU 13 or (ii) data entered via the operation key 19. The ROM 14 is an involatile memory which stores data therein.

The ROM 14 is a ROM, such as an EPROM (Erasable Programmable Read-Only Memory) or a flash memory, into/from which data can be written or deleted. Note that the mobile phone 1 can further be provided with an interface (IF) to which other electronic apparatus is to be connected via a wire, though the interface is not illustrated in FIG. 19.

The camera 16 shoots an image of a subject in accordance with a user's operation of the operation key 19. Note that data of the image thus shot is stored in the RAM or an external memory (e.g., a memory card). The microphone 17 receives audio from a user. The mobile phone 10 digitizes the audio (analog data), and transmits the audio thus digitized to a target (such as other mobile phone). The speaker 18 produces sounds based on data such as music data stored in the RAM 15.

The touch panel system 1 includes a touch panel 2 and a touch panel controller 3. The CPU 13 controls an operation of the touch panel system 1. The CPU executes a program stored in, for example, the ROM 14. The RAM 15 is the volatile memory which stores therein data generated by executing of a program by the CPU 13. The ROM 14 is the involatile memory which stores data therein.

The display controlling circuit 12 controls the display panel 11 to display an image stored in the ROM 14 or in the RAM 15. The display panel 11 (i) is provided so as to overlap the touch panel 2 or (ii) has the touch panel 2 built-in.

The present invention can be described as follows.

It is preferable to configure the touch panel controller of the present invention such that the line dependency includes a sense line dependency and a drive line dependency, and the correction means corrects the sense line dependency in a case where the driving section drives the M drive lines on the basis of the code sequence according to a voltage pattern in which an identical voltage is applied to the M drive lines.

This is because, in a case where (i) first and second electrostatic capacitors have a sense line dependency and (ii) the driving section applies the identical voltage to the M drive lines on the basis of the code sequence, an output from a differential amplifier for amplifying a difference between a first linear sum and a second linear sum is remarkably increased, and consequently easily exceeds a measurable range. For example, according to an Hadamard matrix created by Sylvester method, an identical voltage is applied in the first driving of N drivings. This causes an output to be remarkably increased, thereby causing the output to easily exceed a measurable range.

It is preferable to configure the touch panel controller of the present invention such that the line dependency includes a sense line dependency and a drive line dependency, and the correction means corrects the drive line dependency in a case where the driving section drives the M drive lines by applying, to the M drive lines, voltages of a voltage pattern which induces the drive line dependency.

This is because, in a case where (i) the first and second electrostatic capacitors have a drive line dependency and (ii) the driving section applies, to the M drive lines, the voltages of the voltage pattern which induces the drive line dependency, an output from the differential amplifier for amplifying a difference between a first linear sum and a second linear sum is remarkably increased, and consequently easily exceeds a measurable range.

It is preferable to configure the touch panel controller of the present invention such that the correction means corrects the drive line dependency in a case where the driving section drives the M drive lines on the basis of the code sequence according to a voltage pattern in which (i) a first voltage is applied to odd-numbered drive lines of the M drive lines and (ii) a second voltage, which is equal in absolute value but opposite in sign to the first voltage, is applied to even-numbered drive lines of the M drive lines.

This is because, in a case where (i) the first and second electrostatic capacitors have a dependency on the odd-numbered and even-numbered drive lines and (ii) the driving section applies the M drive lines on the basis of the code sequence by applying the first voltage to the odd-numbered drive lines of the M drive lines and applying, to the even-numbered drive lines of the M drive lines, the second voltage, which is equal in absolute value but opposite in sign to the first voltage, an output from the differential amplifier is remarkably increased, and consequently easily exceeds a measurable range. For example, according to an Hadamard matrix created by Sylvester method, the first voltage and the second voltage are applied to the odd-numbered drive lines and the even-numbered drive lines, respectively, in the second driving of N drivings. This causes an output to be remarkably increased, thereby causing the output to easily exceed a measurable range.

It is preferable to configure the touch panel controller of the present invention such that the correction means corrects the drive line dependency in a case where the driving section drives the M drive lines on the basis of the code sequence according to a voltage pattern in which (i) a first voltage is applied to the first through the $[M/2]^{th}$ (where x in [x] is a positive integer) drive lines of the M drive lines and (ii) a second voltage, which is equal in absolute value but opposite in sign to the first voltage, is applied to the $([M/2]+1)^{th}$ through the $M^{th}$ drive lines of the M drive lines.

According to the configuration, it is possible to correct a drive line dependency between right half (or lower half) and left half (or upper half) of the M drive lines.

It is preferable to configure the touch panel controller of the present invention such that the correction means includes offset means for offsetting the line dependency.

According to the configuration, a capacitance difference due to the line dependency is offset. It is therefore possible to accurately detect changes in capacitance values of first and second electrostatic capacitors which are touched, even if the first and second electrostatic capacitors are produced with capacitance value variations depending on lines due to a production process.

It is preferable to configure the touch panel controller of the present invention such that the offset means includes a correction circuit for correcting a difference between the first capacitance values and the second capacitance values, the correction circuit being connected to the differential amplifier.

According to the configuration, the correction circuit corrects a difference between the first capacitance values and the second capacitance values. Therefore, the difference is not supplied to the differential amplifier. It is therefore possible to accurately detect changes in capacitance values of first and second electrostatic capacitors which are touched, even if the first and second electrostatic capacitors are produced with capacitance value variations depending on lines.

It is preferable to configure the touch panel controller of the present invention such that the correction circuit includes an integral capacitor to which a correction voltage is to be applied, and the offset means discretely changes a capacitance value of the integral capacitor.

According to the configuration, the difference between the first capacitance values and the second capacitance values is corrected by discretely changing the capacitance value of the integral capacitor, and is therefore not supplied to the differential amplifier. It is therefore possible to accurately detect changes in capacitance values of first and second electrostatic capacitors which are touched.

It is preferable to configure the touch panel controller of the present invention such that the correction circuit includes an integral capacitor to which a correction voltage is to be applied, and the offset means discretely changes the correction voltage.

According to the configuration, the difference between the first capacitance values and the second capacitance values is corrected by discretely changing the correction voltage, and is therefore not supplied to the differential amplifier. It is therefore possible to accurately detect changes in capacitance values of first and second electrostatic capacitors which are touched.

It is preferable to configure the touch panel controller of the present invention such that the correction means includes saturation prevention means for preventing the differential amplifier from being saturated with the first linear sum and the second linear sum.

According to the configuration, the differential amplifier for amplifying a difference between the first linear sum and the second linear sum is prevented from being saturated. It is therefore possible to accurately detect changes in capacitance values of first and second electrostatic capacitors which are touched.

It is preferable to configure the touch panel controller of the present invention such that the differential amplifier has a first gain and a second gain at each of which the differential amplifier amplifies the difference, the second gain being smaller than the first gain, and the saturation prevention means causes the differential amplifier to switch from the first gain to the second gain so that the line dependency is corrected.

According to the configuration, a gain of the differential amplifier is reduced. This can prevents the differential amplifier from being saturated. It is therefore possible to accurately detect changes in capacitance values of first and second electrostatic capacitors which are touched.

It is preferable to configure the touch panel controller of the present invention such that the saturation prevention means reduces a voltage to be applied to the M drive lines so that the line dependency is corrected.

According to the configuration, the voltage to be applied to the M drive lines is reduced. This can prevents the differential amplifier from being saturated. It is therefore possible to accurately detect changes in capacitance values of first and second electrostatic capacitors which are touched.

It is preferable to configure the touch panel controller of the present invention such that the saturation prevention means controls the driving section to drive the M drive lines separately so that the line dependency is corrected.

According to the configuration, the M drive lines are driven separately. This can prevents the differential amplifier from being saturated. It is therefore possible to accurately detect changes in capacitance values of first and second electrostatic capacitors which are touched.

It is preferable to configure the touch panel controller of the present invention such that the saturation prevention means controls the driving section to drive some of the M drive lines so that the line dependency is corrected.

According to the configuration, some of the M drive lines are driven. It follows that the number of the M drive lines to be driven is reduced. It is therefore possible to prevent the differential amplifier from being saturated.

It is preferable to configure the touch panel controller of the present invention such that the line dependency includes a sense line dependency and a drive line dependency, the saturation prevention means controls the driving section to drive the M drive lines according to a voltage pattern, which includes no voltage pattern which induces the sense line dependency, so that the sense line dependency is corrected, the saturation prevention means controls the driving section to drive the M drive lines according to a voltage pattern, which includes no voltage pattern which induces the drive line dependency, so that the drive line dependency is corrected, the voltage pattern which induces the sense line dependency is a voltage pattern in which an identical voltage is applied to the M drive lines, each element of the code reference is +1 or −1, in a case where the element is +1, +V volt is applied to the M drive lines, in a case where the element is −1, −V volt is applied to the M drive lines, and the voltage pattern which induces the drive line dependency includes (i) a voltage pattern in which a first voltage is applied to odd-numbered drive lines of the M drive lines, and a second voltage, which is equal in absolute value but opposite in sign to the first voltage, is applied to even-numbered drive lines of the M drive lines and (ii) a voltage pattern in which the first voltage is applied to the first through the $[M/2]^{th}$ (where x in [x] is a positive integer) drive lines of the M drive lines, and the second voltage is applied to the $([M/2]+1)^{th}$ through the $M^{th}$ drive lines of the M drive lines.

According to the configuration, the M drive lines are driven according to the voltage pattern which includes no voltage pattern which induces the line dependency. It is therefore possible to drive the M drive lines without using a voltage pattern which causes the differential amplifier to be saturated. It follows that the differential amplifier is prevented from being saturated.

It is preferable to configure the touch panel controller of the present invention such that in actual operation, the correction means corrects the line dependency on the basis of a result obtained by measuring an output level of the differential amplifier, the output level being measured in a case where the touch panel controller is calibrated.

According to the configuration, the output level of the differential amplifier is measured in the case where the touch panel controller is calibrated, and the line dependency is corrected on the basis of the result of the measurement in actual operation. It is therefore possible to correct a line dependency between capacitance values of first electrostatic capacitors and capacitance values of second electrostatic capacitors of each touch panel controller in accordance with a degree of the line dependency.

It is preferable to configure the touch panel controller of the present invention such that the code sequence is an orthogonal code sequence.

According to the configuration, it is possible to obtain an advantage that an SN ratio becomes larger in a case of driving according to the orthogonal code sequence than in a case of driving according to a code sequence based on an M-sequence.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to (i) a touch panel controller which drives in parallel a plurality of drive lines and which estimates or detects capacitance values of electrostatic capacitors which are arranged in a matrix manner and (ii) an electronic apparatus which employs the touch panel controller. The present invention is also applicable to a fingerprint detecting system.

REFERENCE SIGNS LIST

1: touch panel system
2: touch panel
3: touch panel controller
4: driving section
5: differential amplifier
7: correction circuit
8: saturation prevention control section (saturation prevention means, correction means)
9: offset controlling section (offset means, correction means)
10: mobile phone (electronic apparatus)
11: display panel
20: calibration section (correction means)

The invention claimed is:

1. A touch panel controller, comprising:
a driving section for driving M drive lines on the basis of a code sequence having a length of N (N≥M) so as to drive (i) a plurality of first electrostatic capacitors provided between the respective M drive lines and a first sense line and (ii) a plurality of second electrostatic capacitors provided between the respective M drive lines and a second sense line that is adjacent to the first sense line so that (i) a first linear sum of first capacitance values of the respective plurality of first electrostatic capacitors is outputted from the first sense line and (ii) a second linear sum of second capacitance values of the respective plurality of second electrostatic capacitors is outputted from the second sense line;
a differential amplifier for amplifying a difference between the first linear sum and the second linear sum; and
correction means for correcting a line dependency between the first capacitance values and the second capacitance values.

2. The touch panel controller as set forth in claim 1, wherein the line dependency includes a sense line dependency and a drive line dependency, and
the correction means corrects the sense line dependency in a case where the driving section drives the M drive lines on the basis of the code sequence according to a voltage pattern in which an identical voltage is applied to the M drive lines.

3. The touch panel controller as set forth in claim 1, wherein the line dependency includes a sense line dependency and a drive line dependency, and
the correction means corrects the drive line dependency in a case where the driving section drives the M drive lines by applying, to the M drive lines, voltages of a voltage pattern which induces the drive line dependency.

4. The touch panel controller as set forth in claim 3, wherein the correction means corrects the drive line dependency in a case where the driving section drives the M drive lines on the basis of the code sequence according to a voltage pattern in which (i) a first voltage is applied to odd-numbered drive lines of the M drive lines and (ii) a second voltage, which is equal in absolute value but opposite in sign to the first voltage, is applied to even-numbered drive lines of the M drive lines.

5. The touch panel controller as set forth in claim 3, wherein the correction means corrects the drive line dependency in a case where the driving section drives the M drive lines on the basis of the code sequence according to a voltage pattern in which (i) a first voltage is applied to the first through the $[M/2]^{th}$ (where x in [x] is a positive integer) drive lines of the M drive lines and (ii) a second voltage, which is equal in absolute value but opposite in sign to the first voltage, is applied to the $([M/2]+1)^{th}$ through the $M^{th}$ drive lines of the M drive lines.

6. The touch panel controller as set forth in claim 1, wherein the correction means includes offset means for offsetting the line dependency.

7. The touch panel controller as set forth in claim 6, wherein the offset means includes a correction circuit for correcting a difference between the first capacitance values and the second capacitance values, the correction circuit being connected to the differential amplifier.

8. The touch panel controller as set forth in claim 7, wherein the correction circuit includes an integral capacitor to which a correction voltage is to be applied, and
the offset means discretely changes a capacitance value of the integral capacitor.

9. The touch panel controller as set forth in claim 7, wherein the correction circuit includes an integral capacitor to which a correction voltage is to be applied, and
the offset means discretely changes the correction voltage.

10. The touch panel controller as set forth in claim 1, wherein the correction means includes saturation prevention means for preventing the differential amplifier from being saturated with the first linear sum and the second linear sum.

11. The touch panel controller as set forth in claim 10, wherein the differential amplifier has a first gain and a second gain at each of which the differential amplifier amplifies the difference, the second gain being smaller than the first gain, and
the saturation prevention means causes the differential amplifier to switch from the first gain to the second gain so that the line dependency is corrected.

12. The touch panel controller as set forth in claim 10, wherein the saturation prevention means reduces a voltage to be applied to the M drive lines so that the line dependency is corrected.

13. The touch panel controller as set forth in claim 10, wherein the saturation prevention means controls the driving section to drive the M drive lines separately so that the line dependency is corrected.

14. The touch panel controller as set forth in claim 10, wherein the saturation prevention means controls the driving section to drive some of the M drive lines so that the line dependency is corrected.

15. The touch panel controller as set forth in claim 10, wherein the line dependency includes a sense line dependency and a drive line dependency,
the saturation prevention means controls the driving section to drive the M drive lines according to a voltage pattern, which includes no voltage pattern which induces the sense line dependency, so that the sense line dependency is corrected,
the saturation prevention means controls the driving section to drive the M drive lines according to a voltage pattern, which includes no voltage pattern which induces the drive line dependency, so that the drive line dependency is corrected,
the voltage pattern which induces the sense line dependency is a voltage pattern in which an identical voltage is applied to the M drive lines,
each element of the code reference is +1 or −1,
in a case where the element is +1, +V volt is applied to the M drive lines,
in a case where the element is −1, −V volt is applied to the M drive lines, and
the voltage pattern which induces the drive line dependency includes (i) a voltage pattern in which a first voltage is applied to odd-numbered drive lines of the M drive lines, and a second voltage, which is equal in absolute value but opposite in sign to the first voltage, is applied to even-numbered drive lines of the M drive lines and (ii) a voltage pattern in which the first voltage is applied to the first through the $[M/2]^{th}$ (where x in [x] is a positive integer) drive lines of the M drive lines, and the second voltage is applied to the $([M/2]+1)^{th}$ through the $M^{th}$ drive lines of the M drive lines.

16. The touch panel controller as set forth in claim 1, wherein in an actual operation, the correction means corrects the line dependency on the basis of a result obtained by measuring an output level of the differential amplifier, the output level being measured in a case where the touch panel controller is calibrated.

17. The touch panel controller as set forth in claim 1, wherein the code sequence is an orthogonal code sequence.

18. An electronic apparatus, comprising:
a touch panel controller as set forth in claim 1;
a touch panel controlled by the touch panel controller; and
a display panel which (i) is provided so as to overlap the touch panel or (ii) has the touch panel built-in.

* * * * *